(12) United States Patent  
Bicknell

(10) Patent No.: US 7,907,630 B1  
(45) Date of Patent: Mar. 15, 2011

(54) METHOD AND APPARATUS FOR SWITCHING, MERGING, AND DEMERGING DATA BETWEEN DATA COMMUNICATION LOCATIONS

(75) Inventor: Jeremy Bicknell, Santa Clara, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 634 days.

(21) Appl. No.: 11/928,683

(22) Filed: Oct. 30, 2007

Related U.S. Application Data

(62) Division of application No. 11/040,063, filed on Jan. 19, 2005, now Pat. No. 7,701,957.

(60) Provisional application No. 60/537,497, filed on Jan. 20, 2004.

(51) Int. Cl.
*H04L 7/00* (2006.01)
*H04L 12/28* (2006.01)
*H04J 3/02* (2006.01)

(52) U.S. Cl. ........ 370/467; 370/397; 370/419; 370/537; 375/356; 709/230

(58) Field of Classification Search .......... 370/216–245, 370/374–389, 395–402, 419–467; 709/230–249
See application file for complete search history.

(56) References Cited

U.S. PATENT DOCUMENTS

| | | | | |
|---|---|---|---|---|
| 6,941,405 | B2 * | 9/2005 | Morrow | 710/305 |
| 7,002,967 | B2 * | 2/2006 | Denton et al. | 370/395.5 |
| 7,522,619 | B2 * | 4/2009 | Berman | 370/404 |
| 7,522,633 | B2 * | 4/2009 | Ichino | 370/466 |
| 7,586,941 | B2 * | 9/2009 | Gonda | 370/466 |
| 7,593,431 | B1 * | 9/2009 | Lo et al. | 370/528 |
| 2006/0133411 | A1 * | 6/2006 | Denton et al. | 370/463 |

* cited by examiner

*Primary Examiner* — Man Phan
(74) *Attorney, Agent, or Firm* — Heimlich Law, PC; Alan Heimlich, Esq.

(57) ABSTRACT

A method and apparatus for switching, merging, and demerging data between data communication locations have been disclosed.

9 Claims, 30 Drawing Sheets

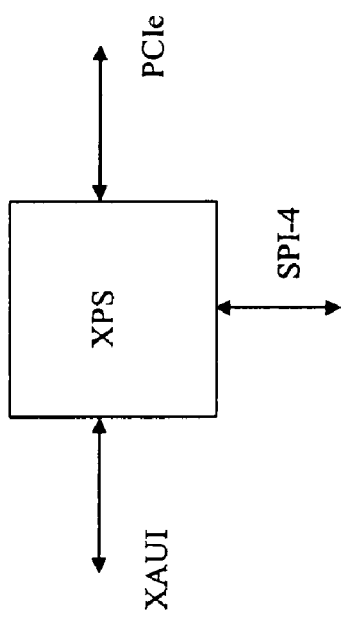
FIG. 14A
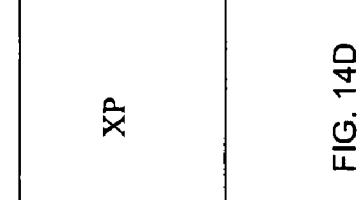
FIG. 14D
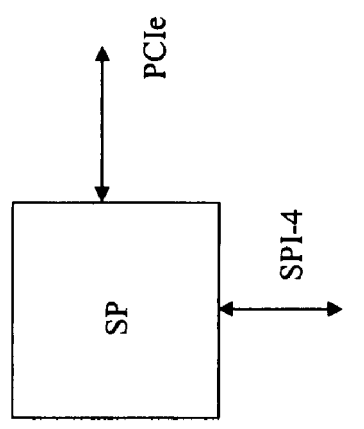
FIG. 14C
FIG. 14B

|  | LIM terminates WAN (frame or cell) | Frame based, processor terminates |
|---|---|---|
| Line | Rate-based or none | Rate-based or none |
| LIM | SPI-4 port Backpressure | SPI-4 port Backpressure + proprietary |
| Switch | None | None |
| Processor | None | proprietary |

METHOD AND APPARATUS FOR SWITCHING, MERGING, AND DEMERGING DATA BETWEEN DATA COMMUNICATION LOCATIONS

RELATED APPLICATION

This patent application is a divisional of Ser. No. 11/040,063, and claims priority to, U.S. Pat. No. 7,701,957 filed Jan. 19, 2005 titled "Method and Apparatus for Switching, Merging, and Demerging Data between Data Communication Locations" which claims priority of U.S. Provisional Application Ser. No. 60/537,497 filed Jan. 20, 2004 titled "Switching, Merging, and Demerging Data between a Physical Media Interface and a Media Access Controller", which are hereby incorporated herein by reference.

FIELD OF THE INVENTION

The present invention pertains to communications. More particularly, the present invention relates to a method and apparatus for switching, merging, and demerging data between data communication locations.

BACKGROUND OF THE INVENTION

Communications is involved with the transfer of data. Data that is in a digital format often needs to be manipulated to achieve effective communication. The manipulation of data is often performed via operations. Some such operations are switching of data, merging of data, and demerging data. These operations may be performed at different physical and/or logical locations. For example, these locations may be, but are not limited to, a physical media interface, a media access controller (MAC), a datalink controller, network search engine, traffic manager. These are but examples of locations for digital format manipulation operations.

Three of the existing approaches for the switching and multiplexing of data between a Physical Media Interface and a Media Access Controller (MAC) are:

1. Direct connection between a Media Interface and a MAC;
2. Direct connection between a Media interface and a packet switch with integrated MAC function; and
3. Serialization and deserialization (bit interleaving) or byte interleaving of data between a Media Interface and a backplane.

These three are illustrated in FIG. 3, denoted 301, 302, and 303 respectively.

FIG. 3, at 301 illustrates a direct connection between a Media Interface and a MAC. This is described in the IEEE 802.3 standard. A Media interface is connected to a MAC via an interface known as the Media Independent interface (MII). The MAC is responsible for performing checking and filtering functions of received data frames and for transmitting data frames in accordance with the standard. A problem with this approach is that for multiple physical connections, a MAC function is required for each physical interface before the data can be multiplexed over a backplane via a system interface. Existing solutions adopt a system interface that is sufficient only for the aggregate bandwidth of the physical interfaces. The MAC and multiplexing function may add latency and complexity to the transfer of data to a backplane including additional flow control and data buffering. In addition, flow control or other MAC functions must be performed in the MAC devices. This adds complexity to the system configuration, control, and management functions. It may be appropriate for small systems with few physical ports and where the entire system can be implemented on a single circuit board; however, it does not "scale" well to larger systems having more ports and many different data processing and forwarding functions which must be carried out by special processors.

FIG. 3, at 302 illustrates a direct connection between a Media interface and an Ethernet or packet switch having an integrated MAC function, such as a Gigabit Ethernet MAC (GE MAC). This approach is described in manufacturers' (such as Broadcom's and Marvel's) literature. A physical layer device connects to a switch device through a local interface. A separate backplane interface is often provided, usually a high speed serial interface of a proprietary nature which may be regarded as a physical layer interface. A problem with this approach is that such switch devices are physically large due to the large number of Inputs/Outputs (I/Os), consume high power, and consequently create thermal problems. For systems having a high number of physical I/Os or functional circuit boards, their use will increase system configuration control and management complexity. In addition, a separate switch device is required to terminate all the high speed data streams, demultplex the data, and provide a further level of switching. This combination of switch devices that have local interfaces and switch devices that have high speed interfaces is also referred to as a switch fabric. Prior attempts to increase the efficiency of switch fabrics have resulted in data loss or large increases in latency. Prior attempts to decrease the number of signals and thereby increase the number of physical media interfaces that can be connected to a switch device has resulted in proprietary interfaces being substituted for interfaces defined in prior standards.

FIG. 3, at 303 illustrates a serialization and deserialization (bit interleaving) or byte interleaving of data between a media interface and a backplane wherein a parallel interface of a physical layer interface, such as a Gigabit Media Independent Interface (GMII) from a Network Processor Unit (NPU), is converted to a serial backplane interface in order to reduce the number of signals, clocking and wiring complexity of the backplane. In this case a MAC function is not required unless a combination or multiplexing of multiple physical interfaces is required according to the alternative prior approaches. A problem with serialization and deserialization and alternative variations of the prior approaches is that for multiple physical interfaces a technique will be required to synchronize multiple parallel interfaces with the serial backplane interface. This adds latency, increases the physical size of the circuit, complexity, and power.

BRIEF DESCRIPTION OF THE DRAWINGS

The invention is illustrated by way of example and not limitation in the figures of the accompanying drawings in which:

FIG. 14 illustrates one embodiment of the invention showing bridging and switching capabilities between a variety of protocols;

FIG. 26 illustrates several flow control methods which are supported by the present invention;

DETAILED DESCRIPTION

Figure 4:
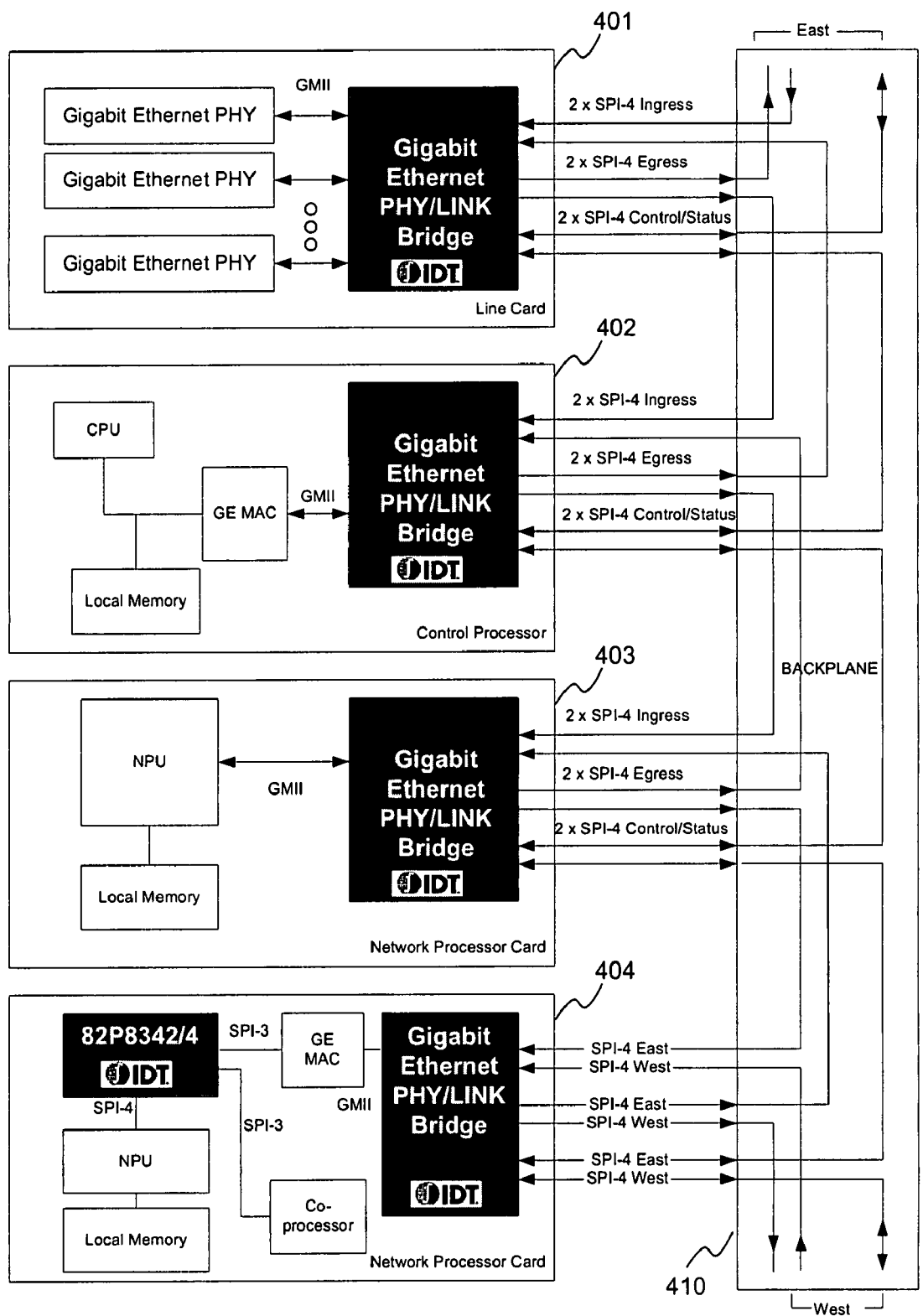
FIG. 4 illustrates one embodiment of the invention showing several different approaches.

FIG. 4 illustrates one embodiment of the invention showing several different approaches. At 401, 402, 403, and 404 a Gigabit Ethernet PHY/LINK Bridge device (referred to as a bridge) is indicated. This device is a Gigabit interface to SPI-4 (System Packet Interface Level 4) data transfer device.

Figure 5:
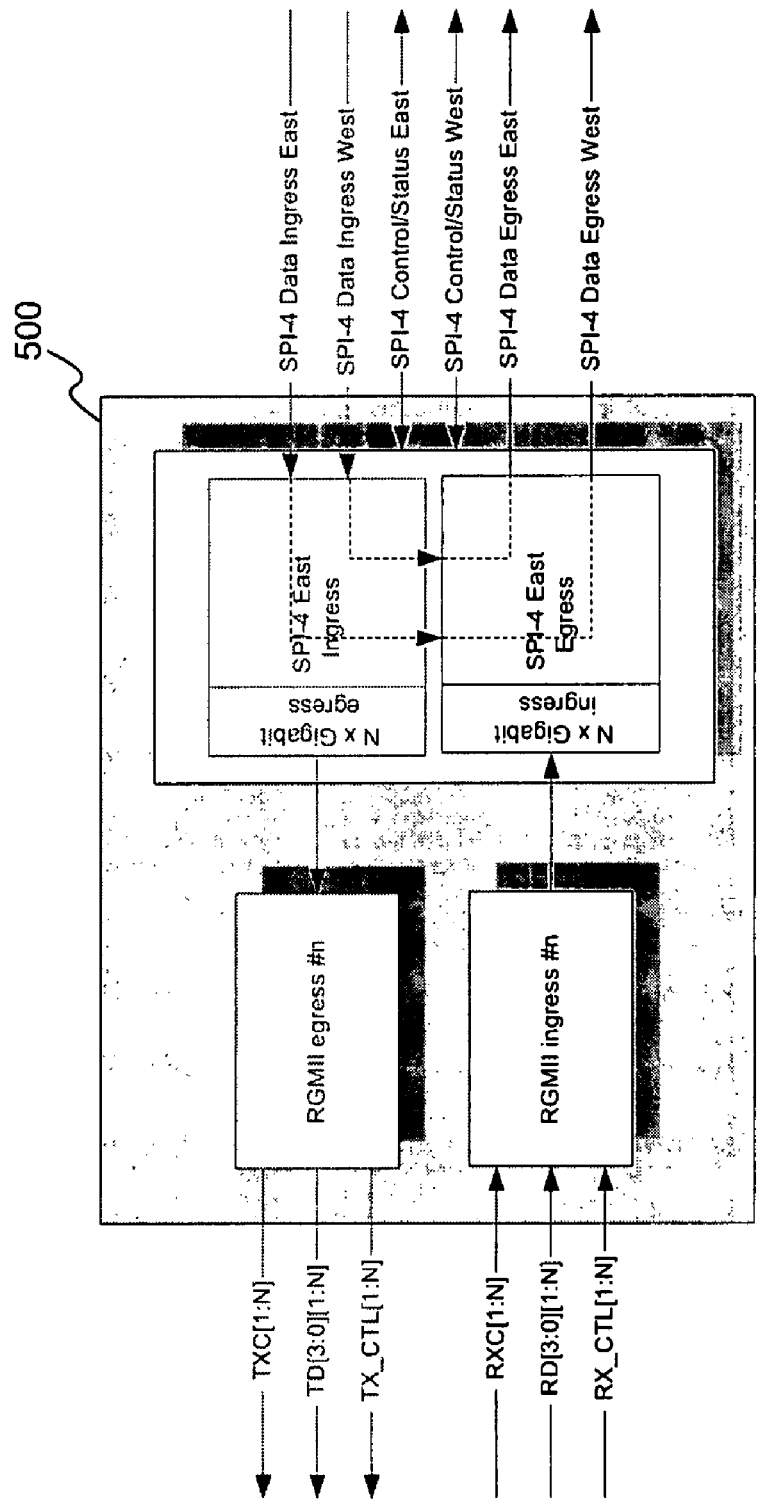
FIG. 5 illustrates one embodiment of the invention in block diagram form.

FIG. 5 illustrates one embodiment of a bridge 500 in block diagram form. As can be seen on the right side of the block diagram are SPI-4 signals. Here are illustrated three major groups. SPI-4 Data inputs are denoted as SPI-4 Data Ingress East and SPI-4 Data Ingress West. SPI-4 bi-directional control and status lines are denoted as SPI-4 Control/Status East and SPI-4 Control/Status West. SPI-4 Data outputs are denoted as SPI-4 Data Egress East and SPI-4 Data Egress West. These signals are in communication with Ingress and Egress block that interface to N×Gigabit ingress and egress blocks that communicate with RGMII (reduced gigabit media independent interface) egress and ingress blocks which are in communication with outputs (TXC—transmit clock, TD—transmit data, and TX_CTL—transmit control) and inputs (RXC—receive clock, RD—receive data, and RX_CTL—receive control).

Referring back to FIG. 4. For a merge operation between GMII (Gigabit Media Independent Interface) and SPI-4, data is received from the media by the PHY (physical layer) and transferred over the GMII as a frame to the ingress FIFO (first in first out). If the GMII indicates an error, the bridge optionally discards the frame. Alternatively the frame may be transferred to the SPI-4 egress interface queue and marked as a packet having an error (referred to as errored). All error free frames and errored frames marked for transfer are transferred to the SPI-4 egress queue. When internal scheduling and external control signals determine that data is to be transmitted over the SPI-4 egress, a SPI-4 egress control word is generated to indicate start of packet and transfer begins of a data fragment of the frame. Remaining data is held in the queue for later transmission. When the end of frame is transmitted, an egress control word is generated. Data is transmitted on each of the N logical ports of the SPI-4 egress interface in, for example, a round-robin fashion, corresponding to the N physical Gigabit ingress ports.

For a demerge operation (SPI-4 to GMII demerge), data received at a SPI-4 ingress port is transferred to a frame buffer. Receipt of a Start of Packet control word causes a frame buffer to be created and optionally immediate transmission of the data at the Gigabit interface. Alternatively, transmission of the frame buffer may be stalled until an End of Packet control word is received at the SPI-4 interface or an error is reported. On receiving an errored packet indication the frame buffer contents are optionally discarded and the error reported to the Gigabit interface egress, or the frame is discarded without indication of error, known as silent discard to those practiced in the area of art of the present invention.

For a SPI-4 to SPI-4 transfer, data received at a SPI-4 ingress port is firstly transferred to a small FIFO. Receipt of a Start of Packet control word causes a data buffer to be created and the data to secondly be transferred to a large segmented buffer and be queued as a result of a queuing operation for transmission at the SPI-4 egress. The queuing operation may require the implementation of linked lists, manipulation of pointers and other implementations known to those skilled in the area of art of the present invention. If a SPI-4 ingress control word indicates an error, the bridge optionally discards the data. Alternatively the data may be transferred to the SPI-4 egress interface queue and marked as an errored packet. All error free data and errored data marked for transfer are transferred to the SPI-4 egress queue. When internal scheduling and external control signals determine that data is to be transmitted over the SPI-4 egress, a SPI-4 egress control word is generated to indicate start of packet and transfer of the data begins. Remaining data is held in the queue for later transmission. When an end of packet is received at a SPI-4 ingress, an egress control word is generated in turn at the SPI-4 egress when the packet data transfer is complete. Data is transmitted on each of the N logical ports of the SPI-4 egress interface in a round-robin fashion, corresponding to the N logical ingress ports mapped to the egress ports.

In one embodiment of the invention, a SPI-4 to SPI-4 versus GMII to SPI-4 (Merge) transfer issue may arise. Since a SPI-4 egress may be configured to receive data from a SPI-4 ingress and any Gigabit ingress, a scheduling issue arises. A fixed priority (round robin) is maintained between Gigabit ingress ports. A SPI-4 ingress port may be configured to have lower or higher priority than a Gigabit ingress port. The default is for the SPI-4 ingress data to have higher priority over the Gigabit ingress port. A higher priority for SPI-4 ingress data is usually required in order to guarantee transfer of control frames from a control processor across the backplane. The scheduling mechanism may use a control input signal comprising calendar entries, weighted internal signals, backpressure signals and other signals.

In one embodiment of the invention, a full set of performance monitoring counters may be provided at all interfaces. Additionally, any or all of the interfaces may be independently disabled.

In one embodiment of the invention flow control is available. For SPI-4 transfers, flow control is defined in the OIF (Optical Internetworking Forum) standard. The Gigabit interface is not generally considered to provide flow control mechanisms although the transmission and reception of "PAUSE" frames as described in the standards is supported. During normal operation a bridge created from a Gigabit ingress to SPI-4 "span" together with SPI-4 to Gigabit egress span is transparent to standard flow control mechanisms such as Pause Frames to be passed over the bridge. Should a data sink attached to the SPI-4 egress not sufficiently deplete data accumulated in the Gigabit frame buffer, a frame buffer overflow may result. Existing frames may be optionally discarded from the frame buffer (partial flush) prior to overflow. New frames arriving at the Gigabit interface may be forwarded to the SPI-4 egress should the data sink attached to the SPI-4 resume operation at an acceptable rate. In other embodiments of the invention, other flow control mechanisms are possible.

In yet another embodiment of the invention, a circuit board may be connected via SPI-4 interfaces on a backplane to a switch device comprised of a logical port Map and an embedded MAC.

401 illustrates one embodiment of the invention as might be implemented on a line card. 402 illustrates one embodiment of the invention as might be implemented using a control processor. 403 illustrates one embodiment of the invention as might be implemented using a network processor. 404 illustrates another embodiment of the invention as might be implemented using a network processor and a SPI-3 to SPI-4 device (denoted 82P8342/4).

What is to be appreciated is the PHY frame level bridging across a backplane between the PHY and the MAC; the scheduling and prioritization stage between the PHY data and backplane data; the use of logical channels in the Backplane to separate the PHY ports; the buffering mechanism provided between bridge devices that removes the need for flow control of the PHY data; and the combination of these. Additionally, the encapsulation of PHY frames from a backplane using an embedded MAC will be appreciated.

Figure 6:
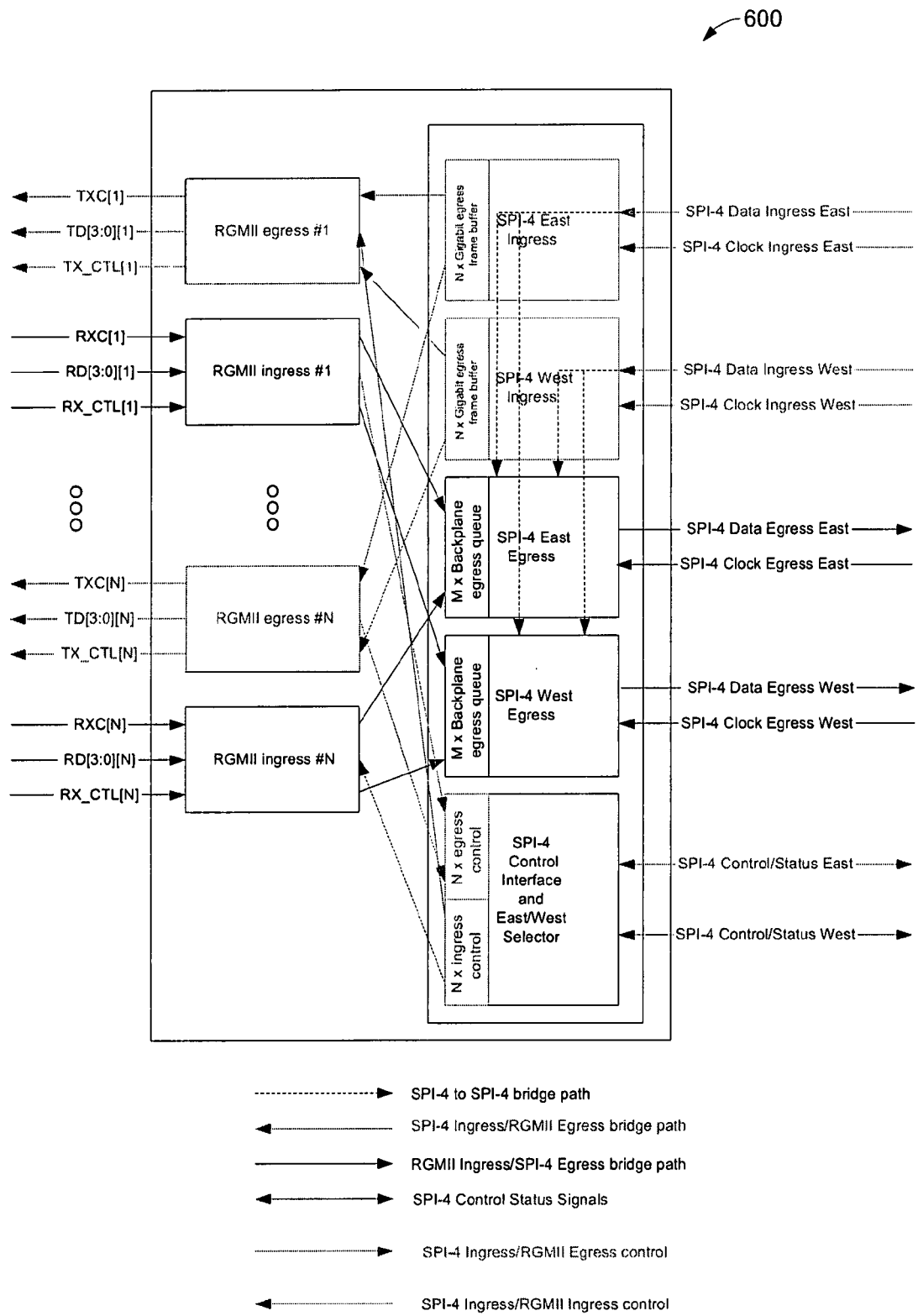
FIG. 6 illustrates data and control flows for one embodiment of the invention.

FIG. 6 illustrates one embodiment of the invention showing a more detailed diagram 600 of data and control flows, as for example, might occur in FIG. 4 and/or FIG. 5.

Figure 7:
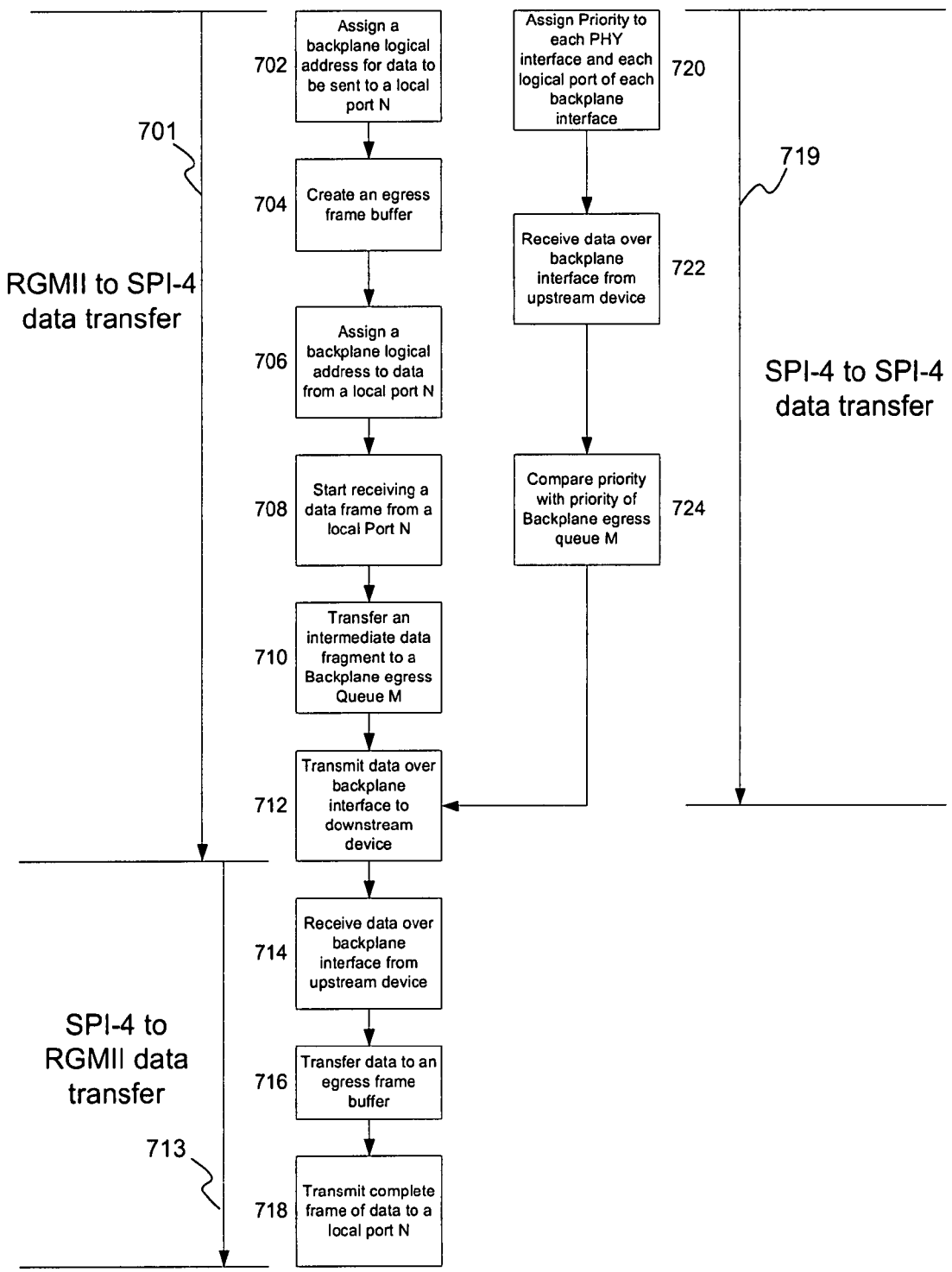
FIG. 7 illustrates flow charts for one embodiment of the invention.

FIG. 7 shows a flow chart of several operations that occur in embodiments of the invention. 701 denotes one embodiment of the invention providing a RGMII to SPI-4 data transfer, which is detailed in 702, 704, 706, 708, 710, and 712. 719 denotes one embodiment of the invention providing a SPI-4 to SPI-4 data transfer, which is detailed in 720, 722, and 724. 713 denotes one embodiment of the invention providing a SPI-4 to RGMII data transfer, which is detailed in 714, 716, and 718.

Figure 8:
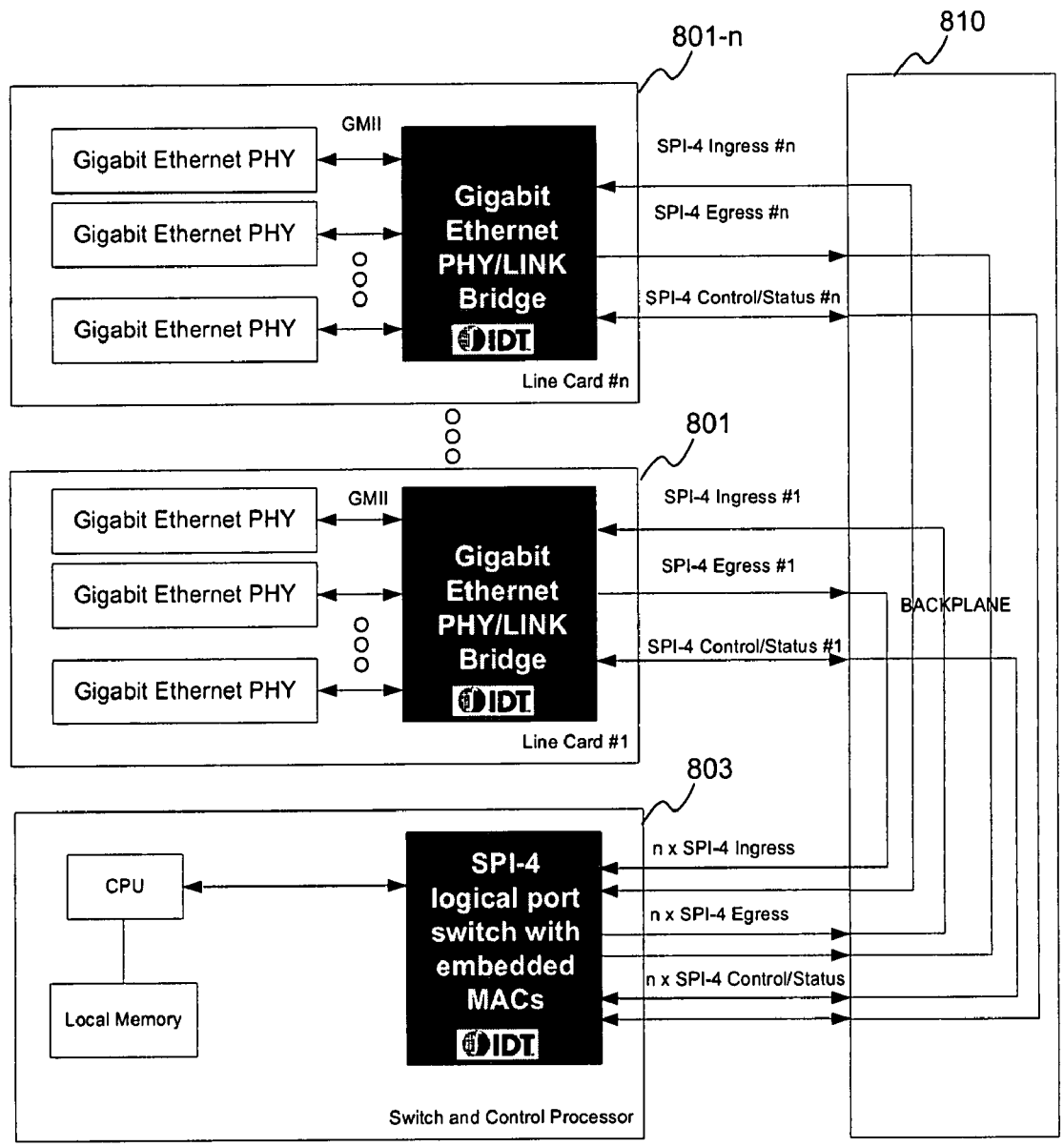
FIG. 8 illustrates one embodiment of the invention showing several different approaches.

FIG. 8 illustrates in block diagram form one embodiment of the invention showing n line cards (801 to 801-*n*), a switch and control processor 803, and interconnection to a backplane 810. FIG. 8 shows a bridge connected to a switch device and embedded MACs.

Figure 9:
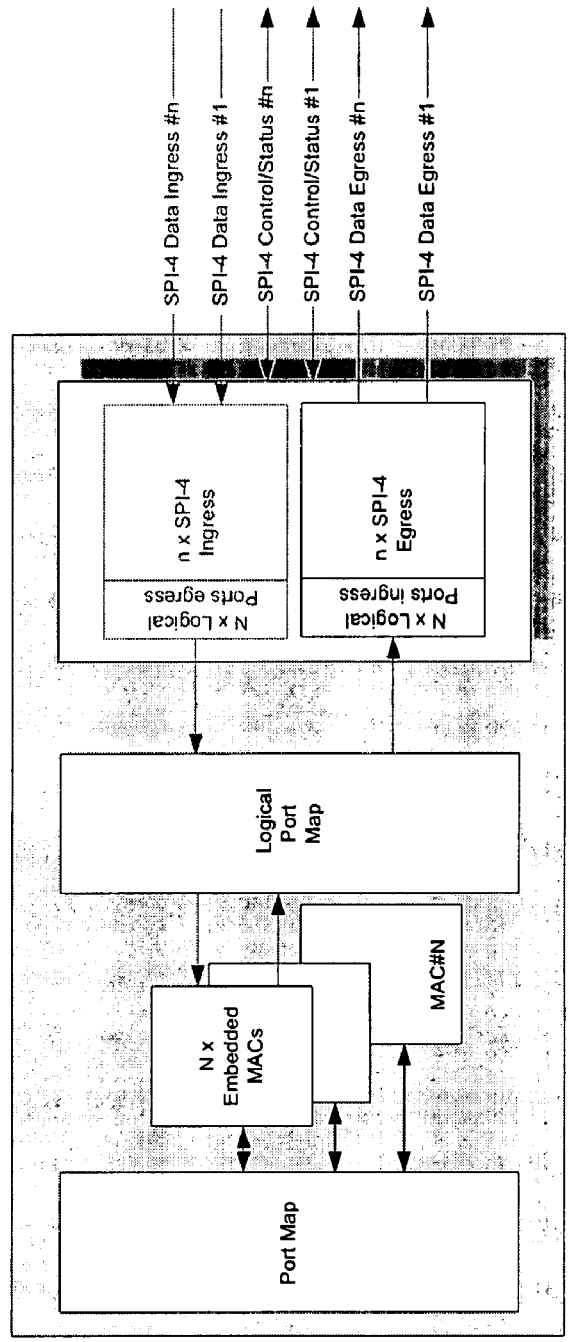
FIG. 9 illustrates one embodiment of the invention showing a switch and MAC.

FIG. 9 illustrates one embodiment of the invention 900 showing a SPI-4 logical port switch with embedded MACs.

Figure 10:
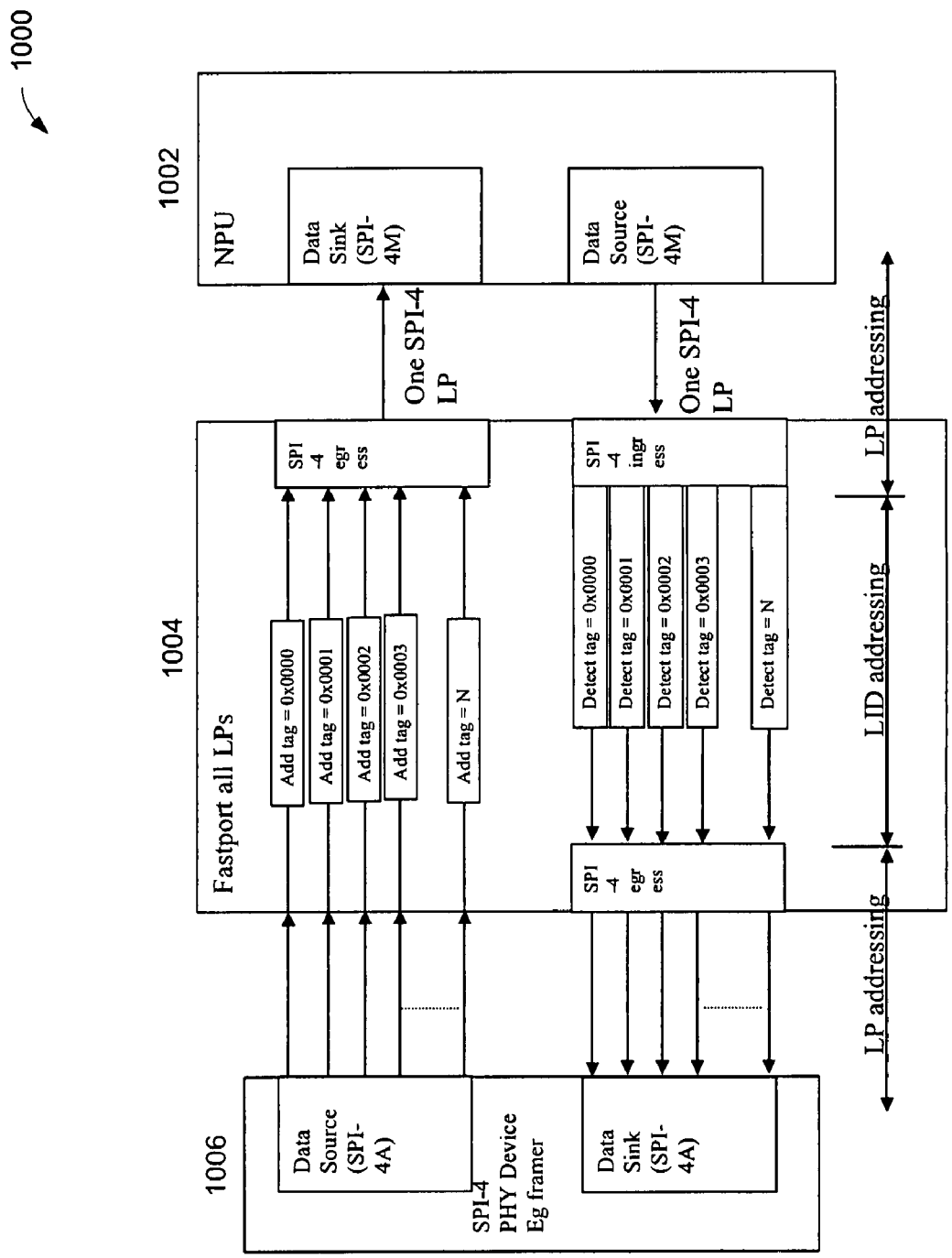
FIG. 10, FIG. 11, FIG. 12, and FIG. 13 illustrate embodiments of packet tagging.

FIG. 10 illustrates one embodiment 1000 of the present invention showing use of packet tagging. Packet tagging is supported in both packet mode and cut-through mode. It provides a way for a device having a lower number of logical ports to exchange packets with a device having a higher number of logical ports. For example, in FIG. 10 an NPU 1002 is only able to accept data on one logical port address. Fastport 1004 is used to transport packet data between the NPU 1002 and a PHY device 1006 that supports 4 logical ports on its SPI-4 interface.

In this embodiment, the main SPI-4 would have its LP address fixed to a single LP for all transfers. Packet transfers are scheduled round robin between LIDs, and a tag (16 bit) is inserted just after the SOP control word at SPI-4M egress. In the SPI-4M ingress, the same type of tag that has been inserted by the NPU is detected just after the SOP control word, removed, and used instead of the LP# to transfer a whole packet to the correct LID.

In one embodiment of the invention, the following functions are supported:

1. Add Tag
    A tag is pre-pended to an egress packet immediately following the SPI-4 control word containing the SOP. The tag value may optionally be set to the following values:
    a) a fixed programmable value. All egress packets on the SPI-4 physical interface will have the same tag value
    b) the corresponding SPI-4 ingress logical port value.
    Note that in some embodiments of the invention, the external data source may be responsible for ensuring different logical port numbers are assigned to packets transferred over different ingress physical ports. In both cases the value of the tag may be assigned any value in the range of, for example, 0 to 255.
2. Detect tag
    A tag is detected as the value of the data at the ingress SPI-4 immediately following an SOP control word.
3. Delete Tag
    The detected tag is optionally deleted after detection and before egress. If no tag is present, the first 2 bytes of every packet may be deleted.
4. Tag to LID map (Detect tag Ingress to Egress data transfer)
    The detected tag value is used to determine the LID used for data transfer according to fixed entries in the ingress LP to LID mapping table. This mapping replaces the LP to LID mapping for those LPs configured with the TAG_DETECT tag option
5. LID to Tag map (Ingress to add tag Egress data transfer)
    The TAG_PORT entry corresponding to each LID is used to determine the value of the tag added to each packet scheduled for the egress LP. This mapping adds the ability to map more than one LID to each egress LP if the TAG_ADD bit is set.

A tag may be detected, deleted, and added on the same data flow that consists of ingress logical port, LID and egress logical port. Note that this has the effect of modifying the tag between ingress and egress.

By mapping all possible tag values to LIDs, it is possible for a data source to determine routing dynamically on a per packet basis among SPI-4 physical and logical ports by providing a different tag value on each ingress packet.

Figure 11:

In one embodiment of the invention, in cut-through mode, the same tag value must be used for each packet directed to the same egress physical and logical port. Packet tag position in cut-through mode is illustrated in FIG. 11.

Figure 12:

In one embodiment of the invention, in packet mode, different tag values can be used for each packet directed to the same egress physical and logical port. Packet tag position in packet mode is illustrated in FIG. 12.

Figure 13:

In one embodiment of the invention, the tag value TAG_PORT may have any value in the range 0 to 255. The maximum number of different tag value entries in the LID mapping table is 128 for SPI-4 M LID tables (main SPI-4) and 64 for each of SPI-4A and SPI-4B (tributary SPI-4) LID mapping tables. Note that for compatibility with future uses of the tag feature, the data source should be able to prepend a tag per packet having any 16-bit value. FIG. 13 illustrates one embodiment of the tag format for the present invention.

In various embodiments of the present invention, bridging and switching capabilities between varieties of protocols is possible. FIG. 14 shows several possible embodiments. FIG. 14A shows a 10 GbE (XAUI—ten attachment unit interface) to a PCIe (PCI express) and SPI-4 exchange (XPS). Subsets are shown at FIG. 14B a XAUI to SPI-4 exchange (XS), at FIG. 14C a SPI-4 to PCIe exchange (SP), and FIG. 14D a XAUI to PCIe exchange (XP). Other embodiments are also possible.

In various embodiments the present invention provides a flexible network infrastructure. For example, in one embodiment of the present invention aggregation of virtual connections as well as aggregation of SPI-4 ports is possible. The present invention also provides for "virtual channelization" of a 10 Gbps clear channel and allows for better utilization of limited SPI-4 ports on an NPU.

In one embodiment of the present invention, it is possible to extend the packet exchange architecture to comprise clear channel 10 Gbps interfaces. This allows channel density per line card to match a new generation of SONET/SDH (synchronous optical network/synchronous digital hierarchy) framers. Additionally, further cost reductions in the future are possible by eliminating the NPU and/or the traffic manager from the line card and by placing these functions at a central location. The present invention in one embodiment, provides links for multi-chip, multi-board, multi-chassis systems based on 10 Gbps SPI-4 links. By offering a serial interface, in one embodiment, the present invention facilitates physical connections chip-to-chip, 20-40 in. using FR4 (fenolic resin four) PCB traces+connectors and CX-4 (copper ten gigabit four) interconnect cables.

Figure 15:
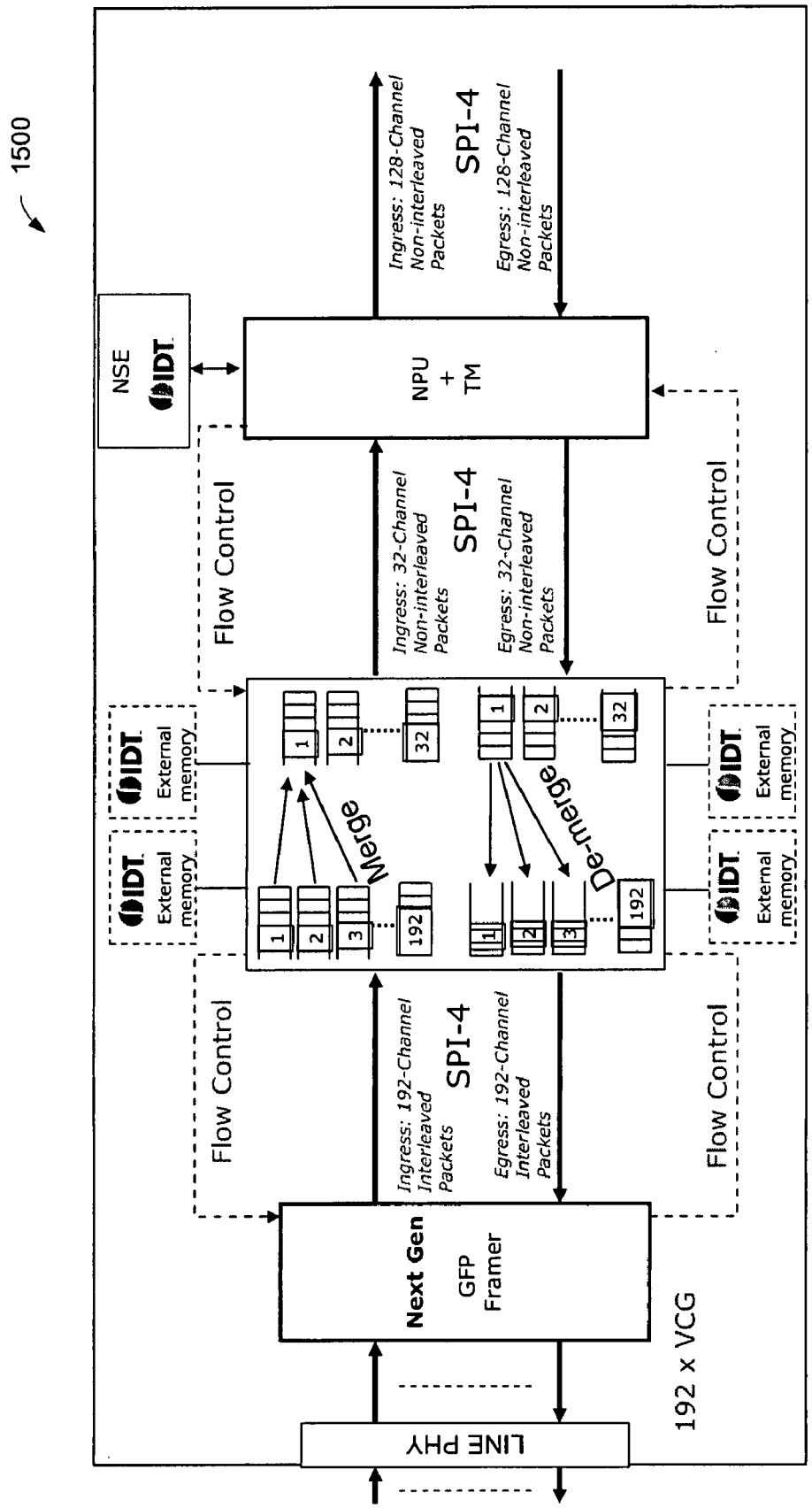
FIG. 15 illustrates one embodiment of the present invention in a high channel count optical transport line card.

FIG. 15 illustrates one embodiment of the present invention in a high channel count optical transport line card (X-SPI) 1500.

Figure 16:
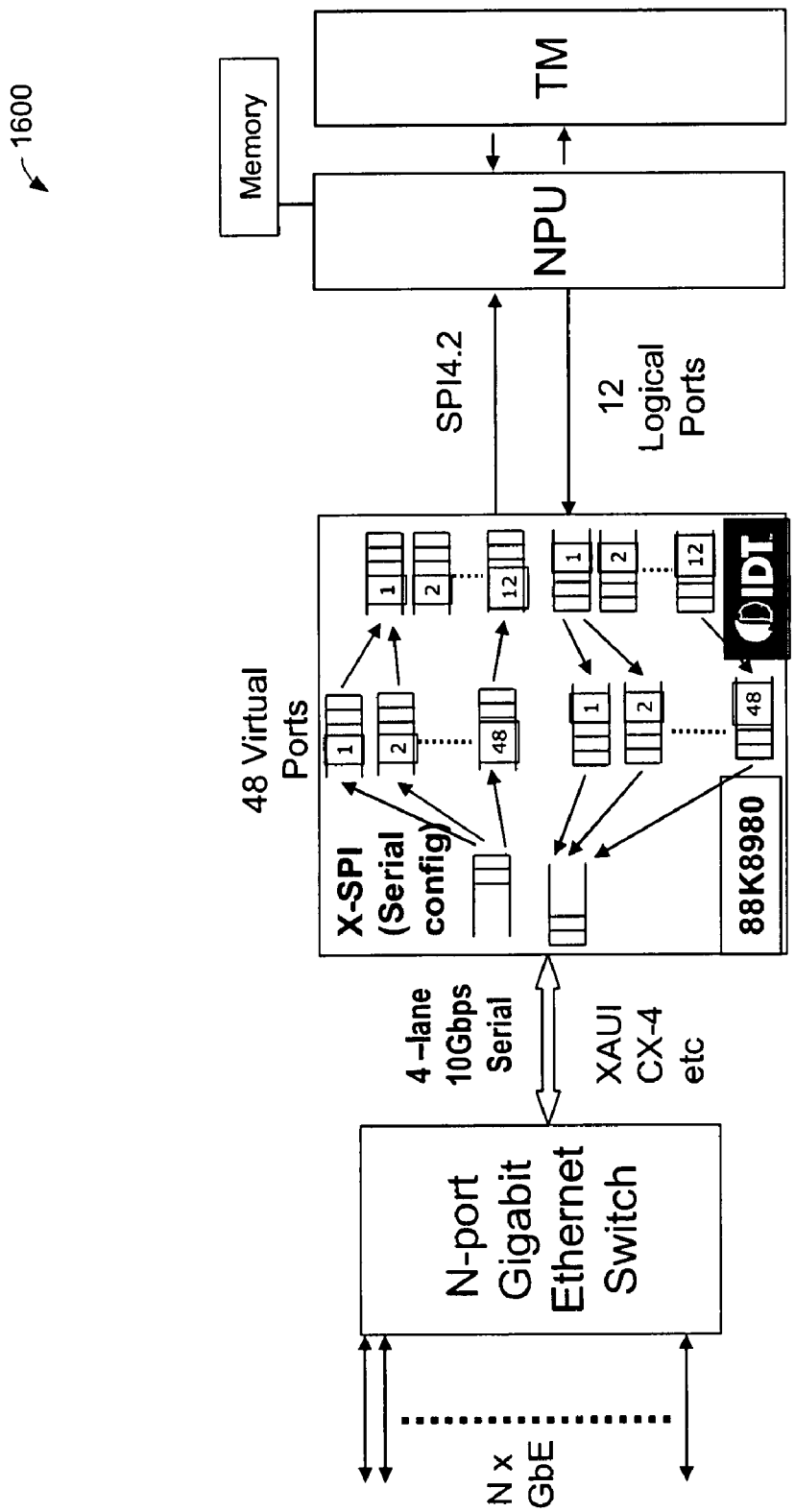
FIG. 16 illustrates one embodiment of the present invention in a Gigabit Ethernet switch/router.

FIG. 16 illustrates one embodiment of the present invention in a Gigabit Ethernet switch/router 1600. Here the X-SPI serial version converts between one logical port to low logical port count and schedules 48 "virtual" ports. Here the NPU may add additional L4-L7 features comprising, IPv6, TCP segmentation and reassembly and security features. These are but some of the additional features afforded by the NPU in one embodiment of the present invention.

Figure 17:
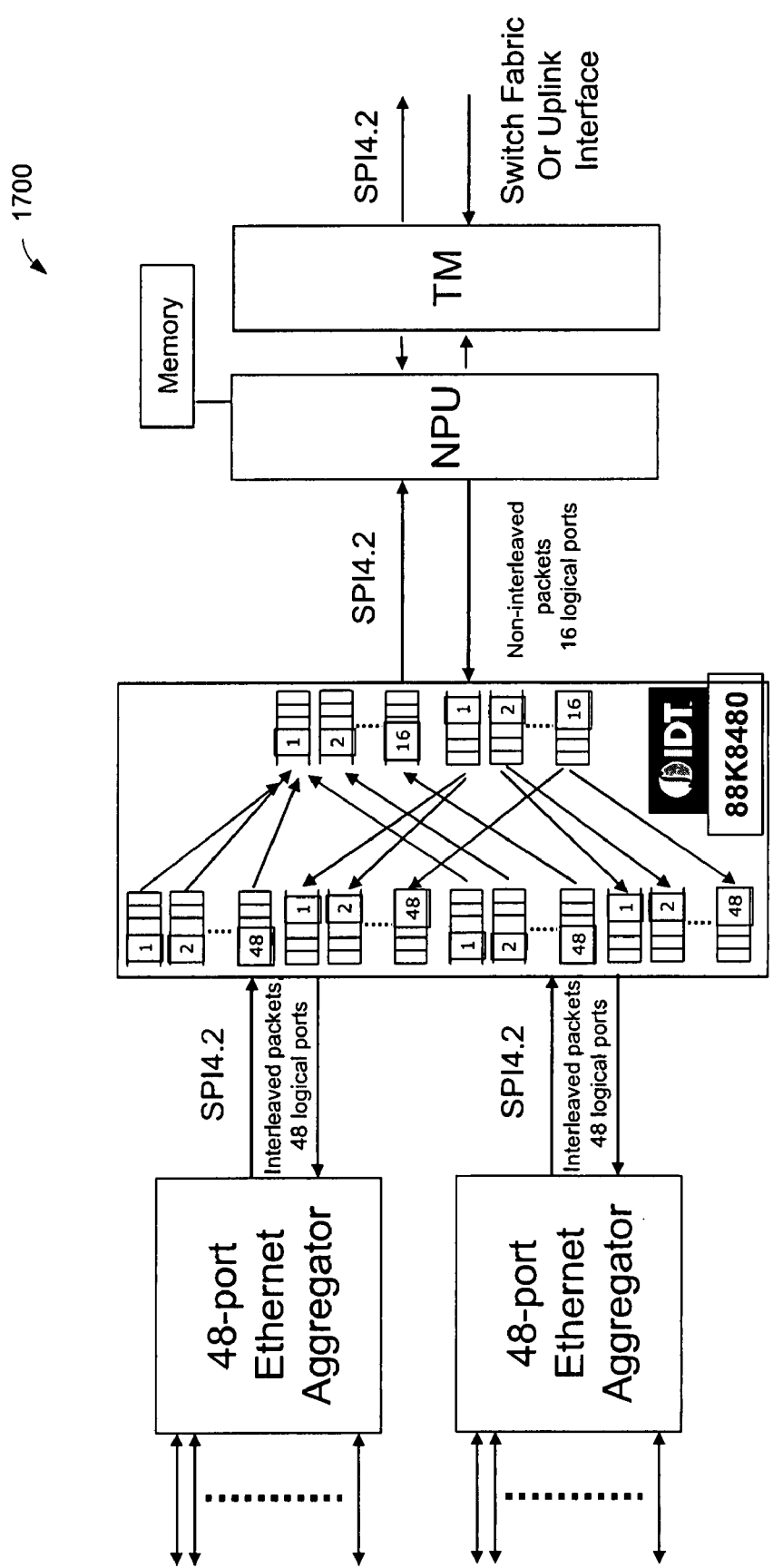
FIG. 17 illustrates one embodiment of the present invention in a high density 4:1 oversubscribed switch/router line card.

FIG. 17 illustrates one embodiment of the present invention in a high density 4:1 oversubscribed switch/router line card 1700. Here the present invention provides cut-through to packet conversion, thereby preventing loop delay packet loss (FIFO over-runs) and bandwidth loss (FIFO under-runs). The embodiment also provides the benefit of rescheduling packet data transfers between a high logical port count packet interface and a low logical port count interface.

Figure 18:
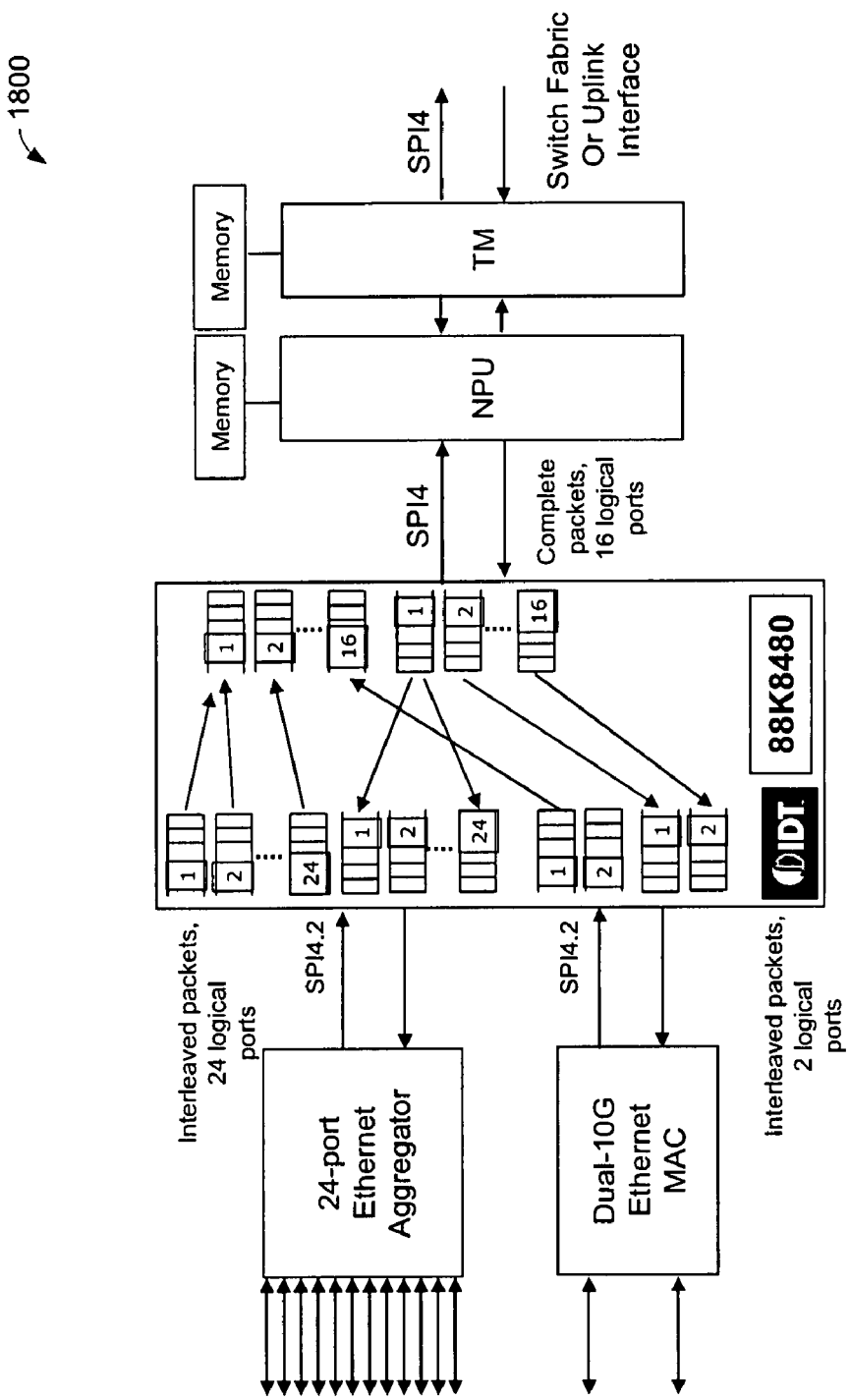
FIG. 18 illustrates one embodiment of the present invention in a clear channel SPI-4 Packet Exchange Ethernet oversubscription.

FIG. 18 illustrates one embodiment of the present invention in a clear channel SPI-4 Packet Exchange Ethernet oversubscription 1700.

Figure 19:
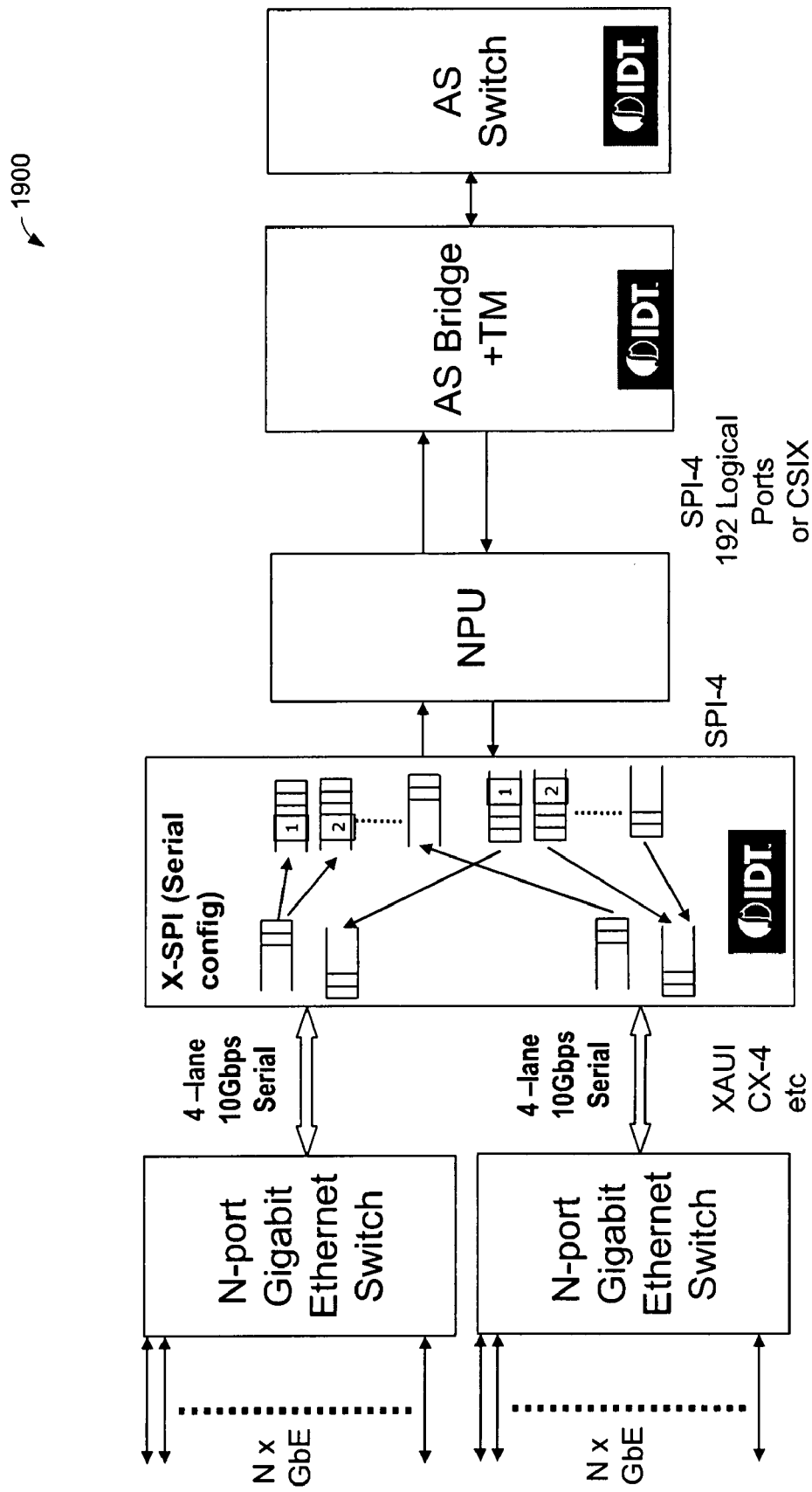
FIG. 19 illustrates one embodiment of the present invention in a high density AS-based switch/router line card.

FIG. 19 illustrates one embodiment of the present invention in a high density AS (Advanced Switching)-based switch/router line card 1900. Here the NPU interfaces to the AS bridge and TM (Traffic Manager) which interfaces to the AS switch.

In one embodiment of the present invention, as illustrated in several figures as a X-SPI device, the present invention has applications in such areas as Ethernet line cards used in switches and routers, for SONET or optical transport networks (OTN), GigE switch/routers, etc. As illustrated the present invention can drive a lower cost per system-port, it facilitates use of high oversubscription techniques (4:1, 8:1), can yield higher channel density per line card, and can fully utilize NPUs, switch fabrics, chassis space, etc.

Figure 20:
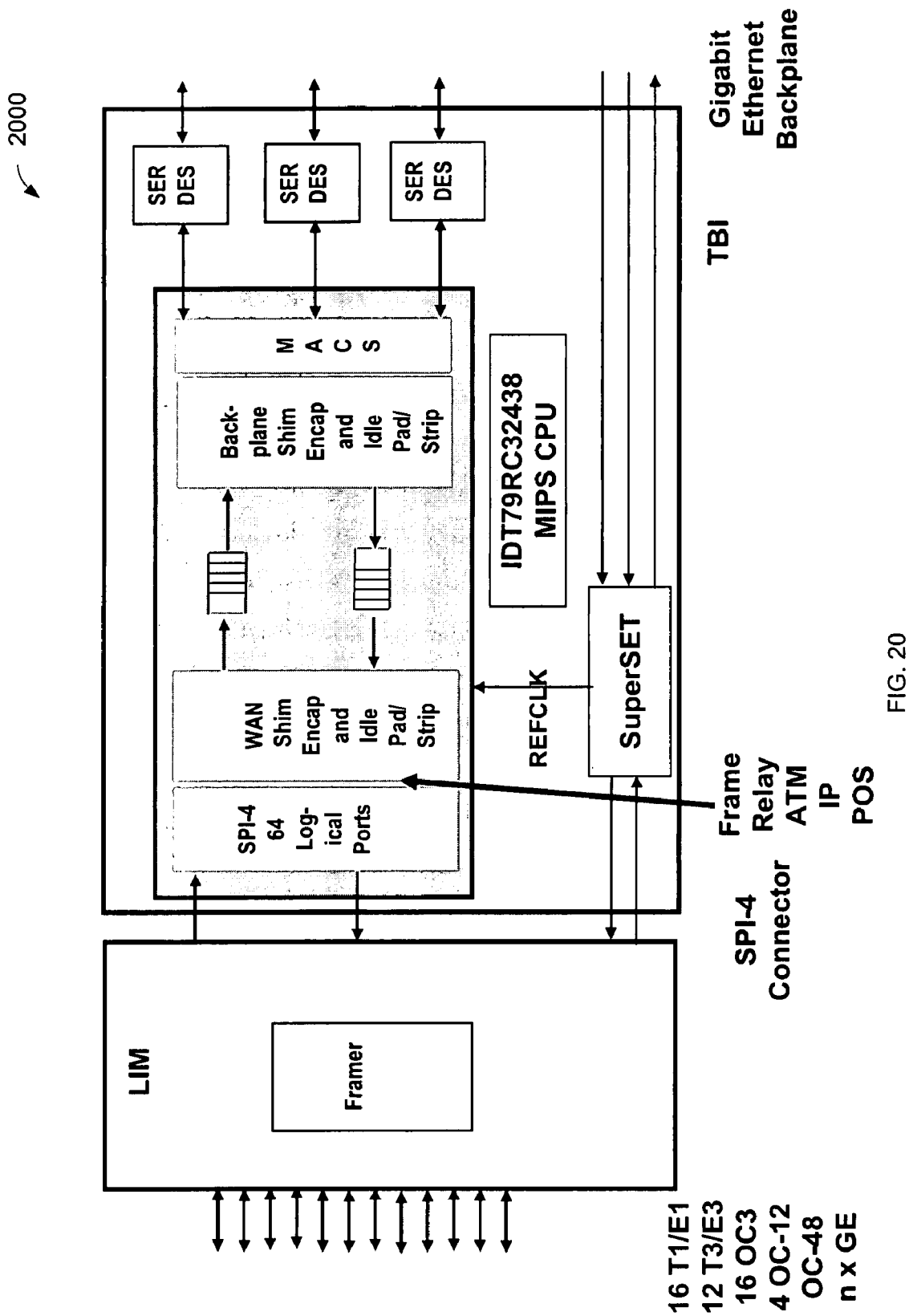
FIG. 20 illustrates one embodiment of the present invention showing application functions and interfaces.

FIG. 20 illustrates one embodiment of the present invention showing application functions and interfaces 2000. Here, a LIM (Line Interface Module) communicates with a SPI-4 and SuperSet stratum-compliant clock module integrated circuit.

Figure 21:
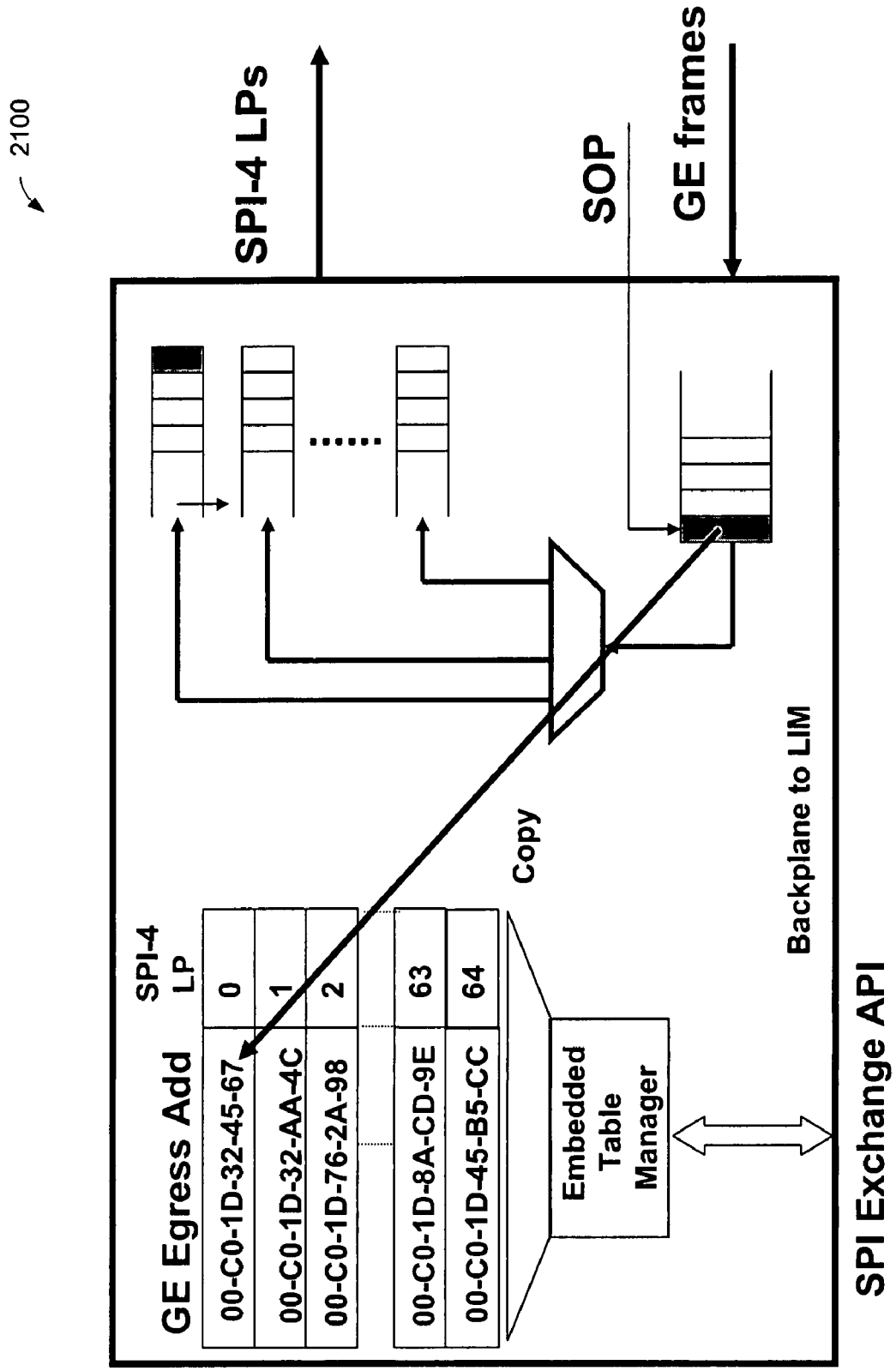
FIG. 21 illustrates one embodiment of the present invention showing backplane shim functionality in the backplane to LIM.

FIG. 21 illustrates one embodiment of the present invention showing backplane shim functionality in the backplane to LIM 2100.

Figure 22:
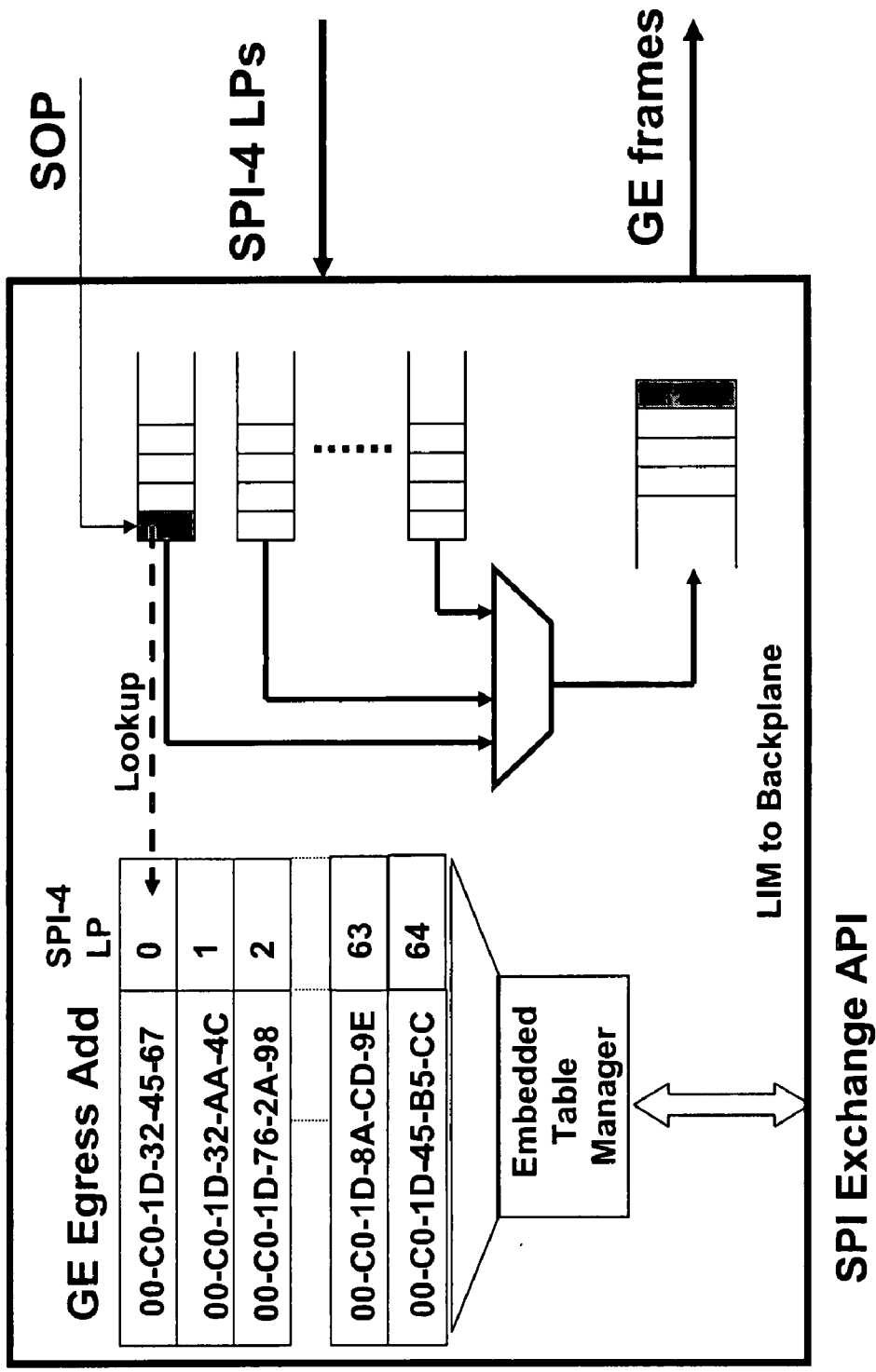
FIG. 22 illustrates one embodiment of the present invention showing backplane shim functionality in the LIM to backplane direction.

FIG. 22 illustrates one embodiment of the present invention showing backplane shim functionality in the LIM to backplane direction 2200.

Figure 23:
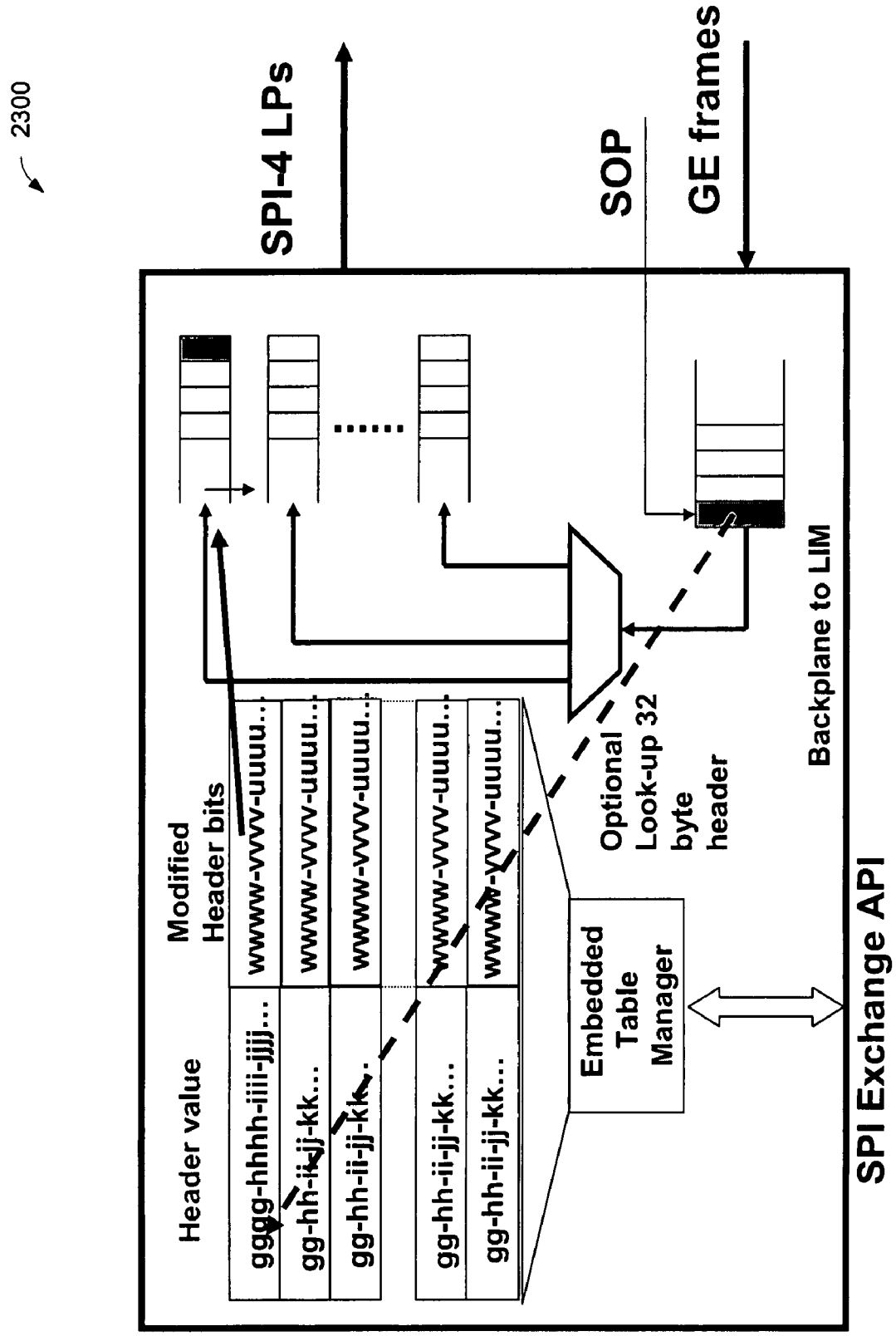
FIG. 23 illustrates one embodiment of the present invention showing WAN shim functionality in the backplane to board direction.

FIG. 23 illustrates one embodiment of the present invention showing WAN shim functionality in the backplane to board direction 2300.

Figure 24:
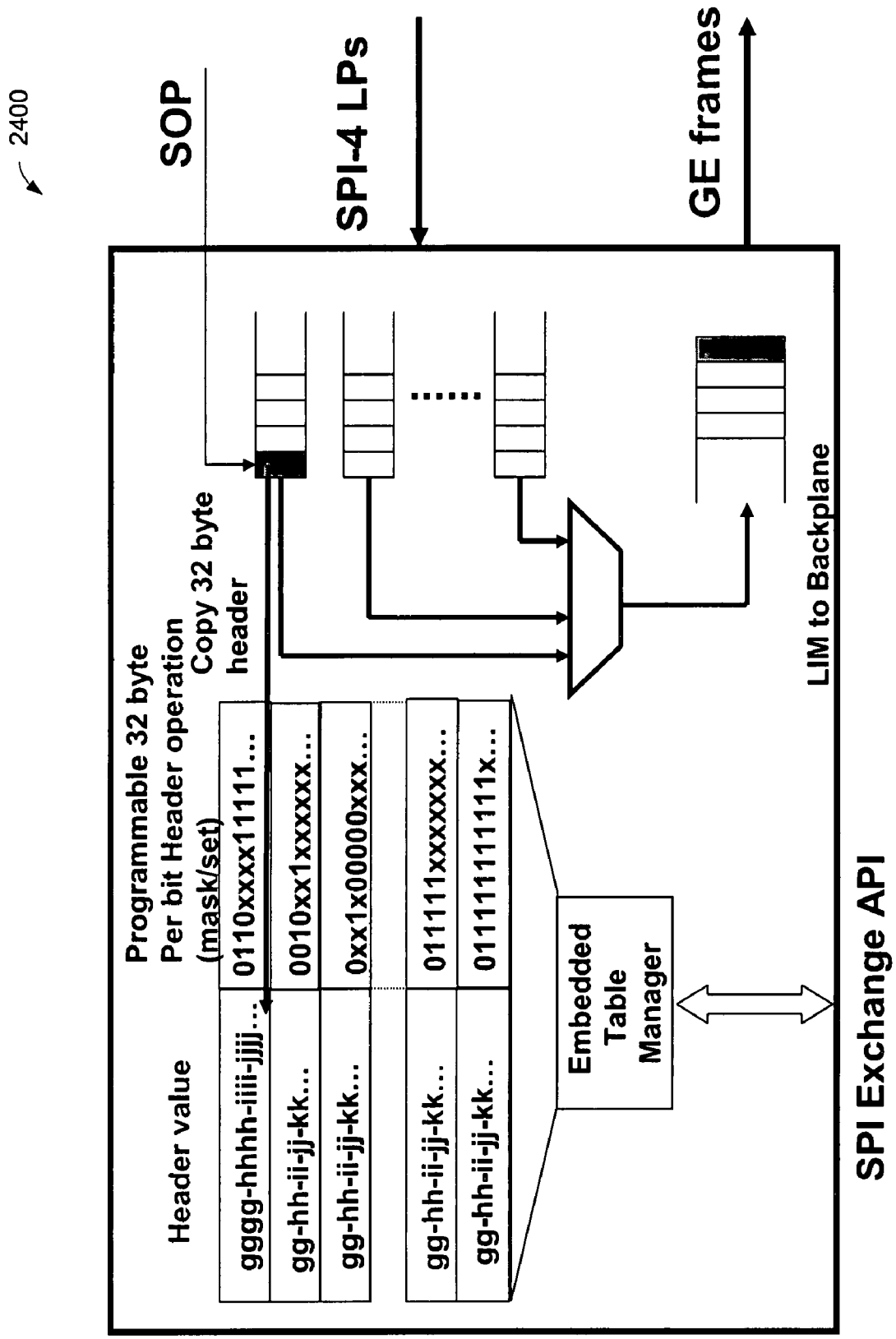
FIG. 24 illustrates one embodiment of the present invention showing WAN shim functionality in the LIM to backplane direction.

FIG. 24 illustrates one embodiment of the present invention showing WAN shim functionality in the LIM to backplane direction 2400.

Figure 25:
FIG. 25 illustrates one embodiment of the present invention showing some encapsulation approaches.
Figure 25:
Figure 25:
Figure 25:
Figure 25:
Figure 25:

FIG. 25 illustrates one embodiment of the present invention showing some encapsulation approaches 2500. "Prot" depends on switch frame type, generally 2-6 unused bytes. "Tag" is an optional per-packet specified Tag for use with LIM cards devices having insufficient SPI-4 logical ports but which can support packet tagging.

FIG. 26 illustrates several flow control 2600 methods that are supported by the present invention.

Various embodiments of the present invention support different functionality. For example, in one embodiment having SPI-4-to-SPI-4 data paths there may be two independent bidirectional SPI-4 interfaces. Other embodiments may include, but are not limited to, 2×SPI-4+10 Gbps clear channel serial interface, SPI-4 to 2×10 Gbps clear channel serial interface with redundancy, SPI-4 to SPI-4 logical port merging/demerging, etc. Additionally, other options are possible, for example, loop back and redirect paths, hardware API for control, fully programmable 10 Gbps 128 bit look ups for any standard or proprietary tag or MTU header. Additionally, the clear channel packet exchange may be used for multi-chip, multi-board, multi-chassis systems based on 10 Gbps SPI-4 links. These can be designed to complete data paths between NPUs, CoPUs, ASICs, PHYs, FPGAs, multi-Qs, other SPI Exchanges, connectors, FR4 PCB traces and CX-4 interconnect cables.

In one embodiment of the present invention several operations may be used. For example, packet tag or MTU header lookups may be used to create and detect virtual ports within a clear channel. This provides a CAM (content addressable memory)-like function of up to 256 virtual ports. Additionally, embodiments of the present invention may merge or de-merge SPI-4 logical ports using virtual ports, and may add or modify tags or headers in addition to the SPI-4 standard.

Figure 27:
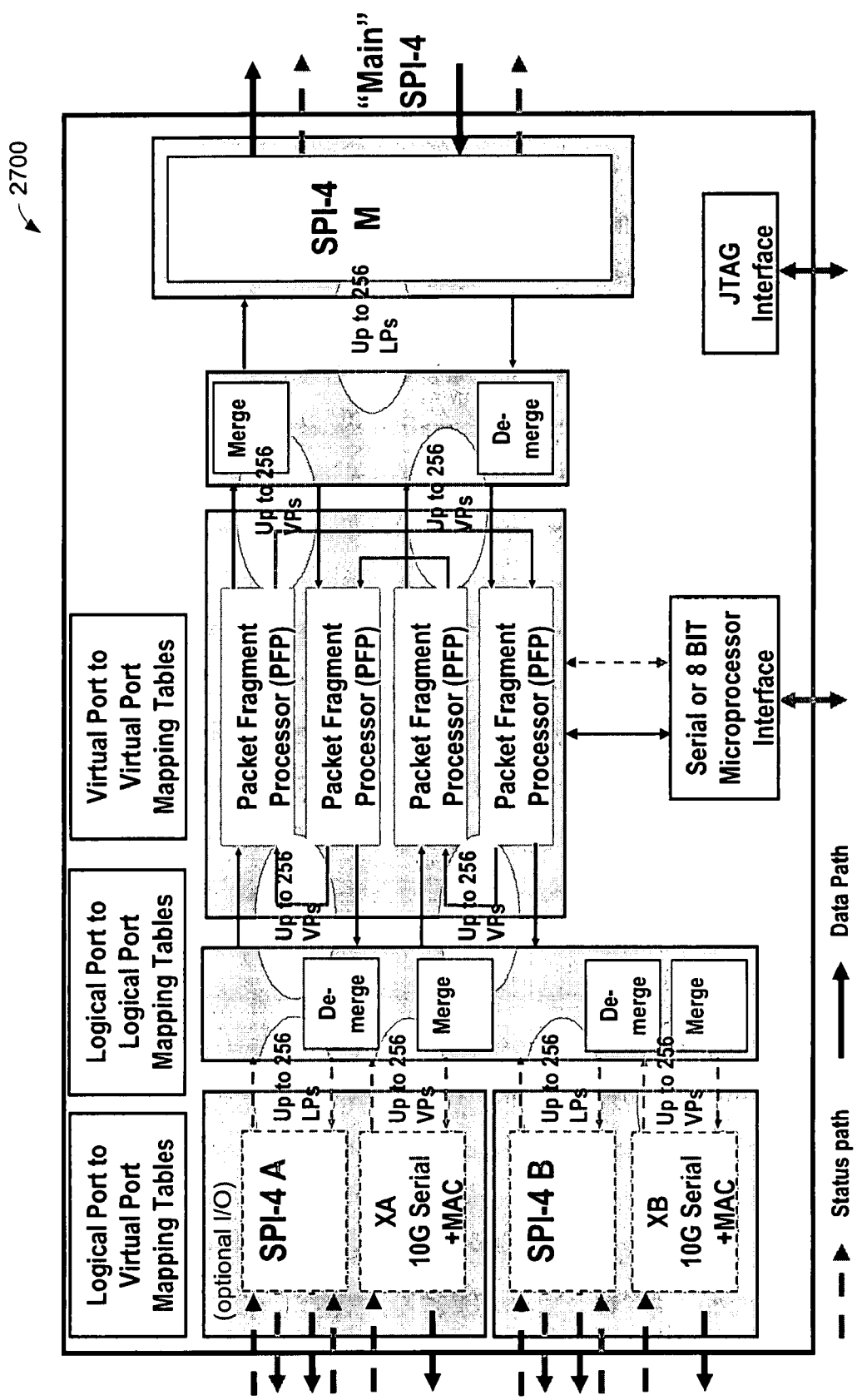
FIG. 27 illustrates one embodiment of the present invention showing a SPI-4 clear channel packet exchange.

FIG. 27 illustrates one embodiment of the present invention showing a SPI-4 clear channel packet exchange 2700.

Figure 28:
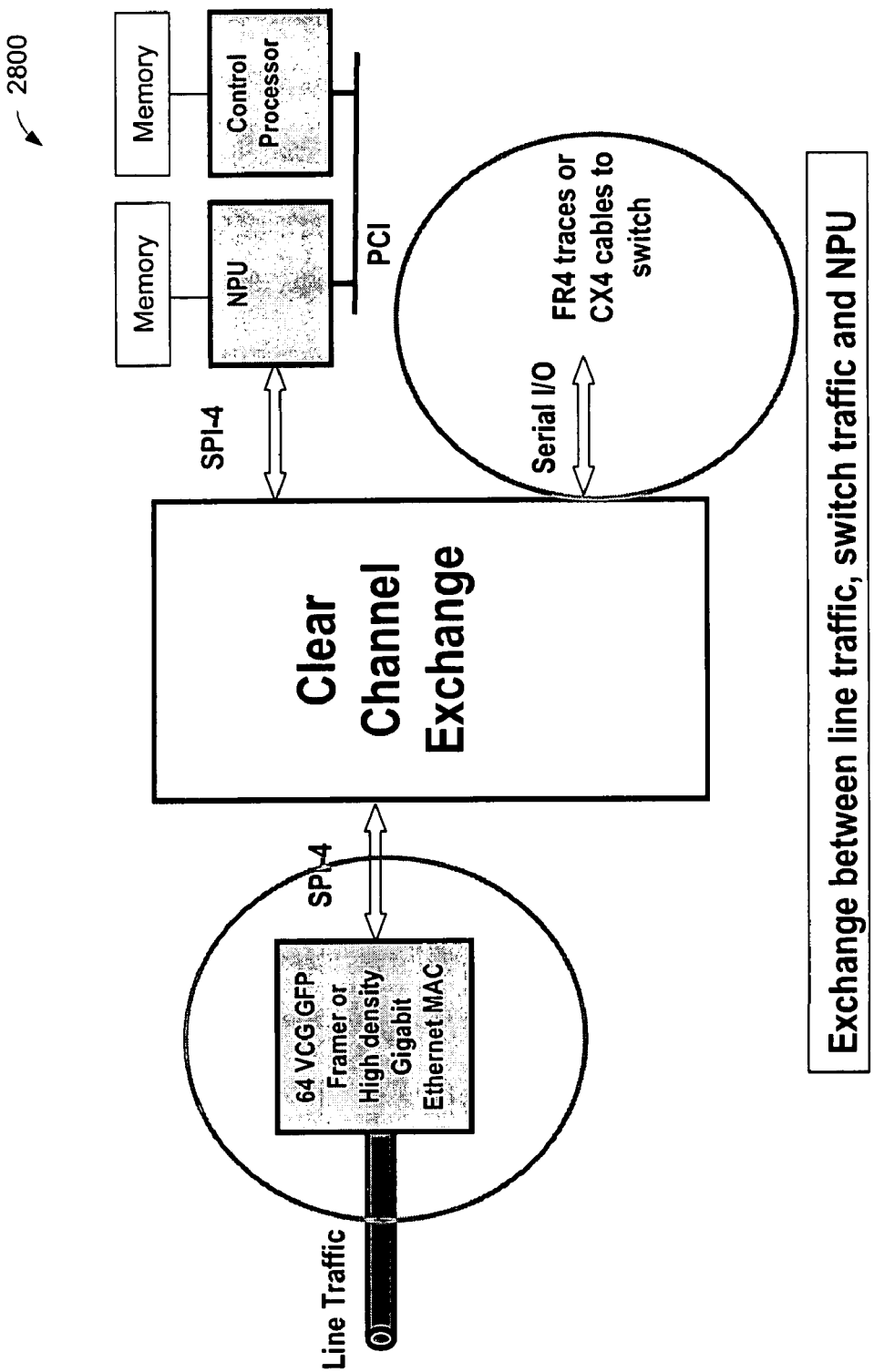
FIG. 28 illustrates one embodiment of the present invention showing an optical transport.

FIG. 28 illustrates one embodiment of the present invention showing optical transport 2800.

Figure 29:
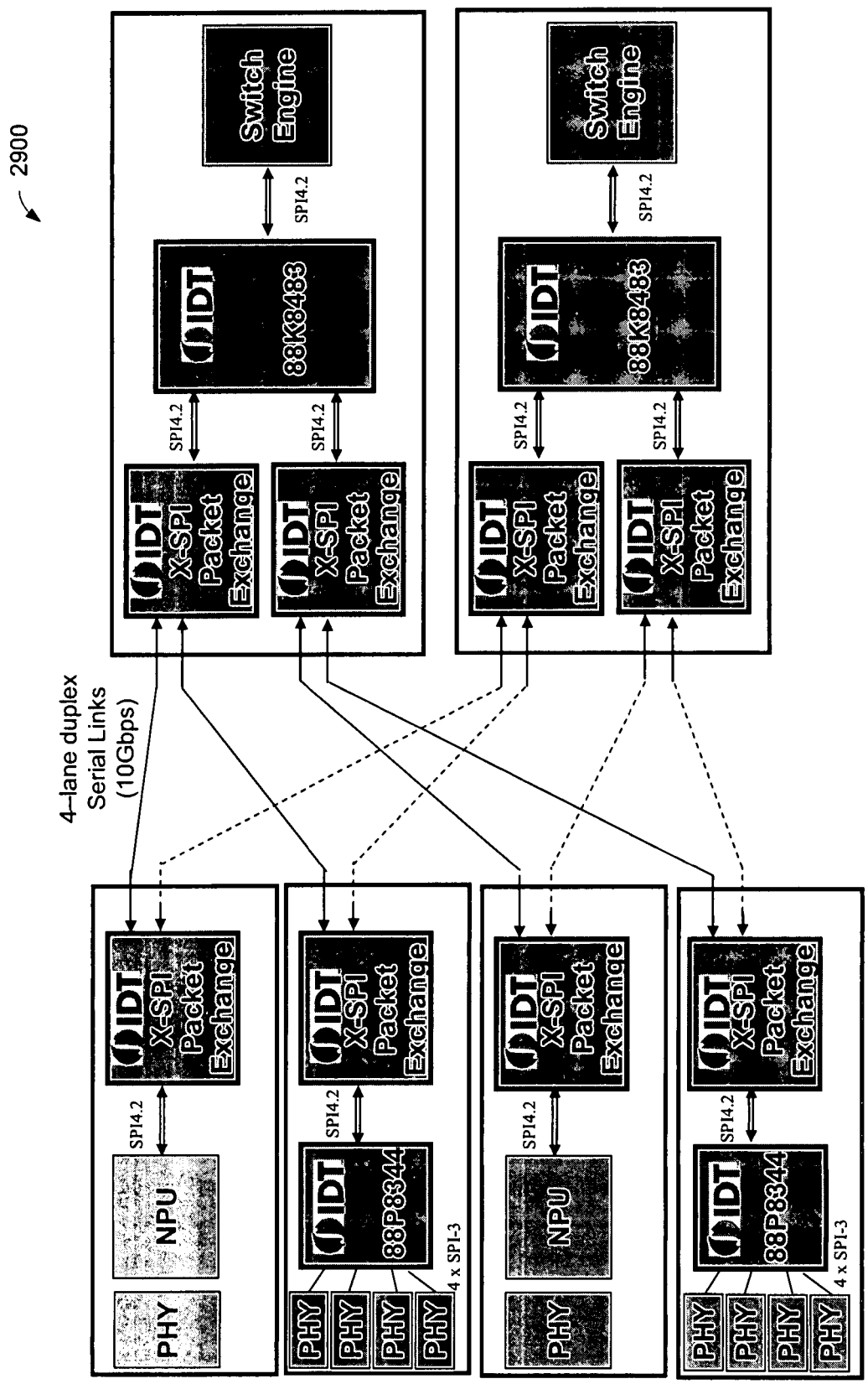
FIG. 29 illustrates one embodiment of the present invention showing an application with redundancy.

FIG. 29 illustrates one embodiment of the present invention showing an application with redundancy 2900. Here the application aggregates high port count media interfaces denoted by "PHY" which may additionally comprise integrated or discrete MACs or framers to a low port count NPU. For example, a 64 port GFP (Generic Framing Procedure) framer, 48 port MAC or switch to a 16 port NPU. The application creates channel groups by merging/demerging SPI-4 LPs, has serial I/O connects to board traces, 2× connectors or cable, and provides a redundancy solution for switch and line card hot-swap operations.

Figure 30:
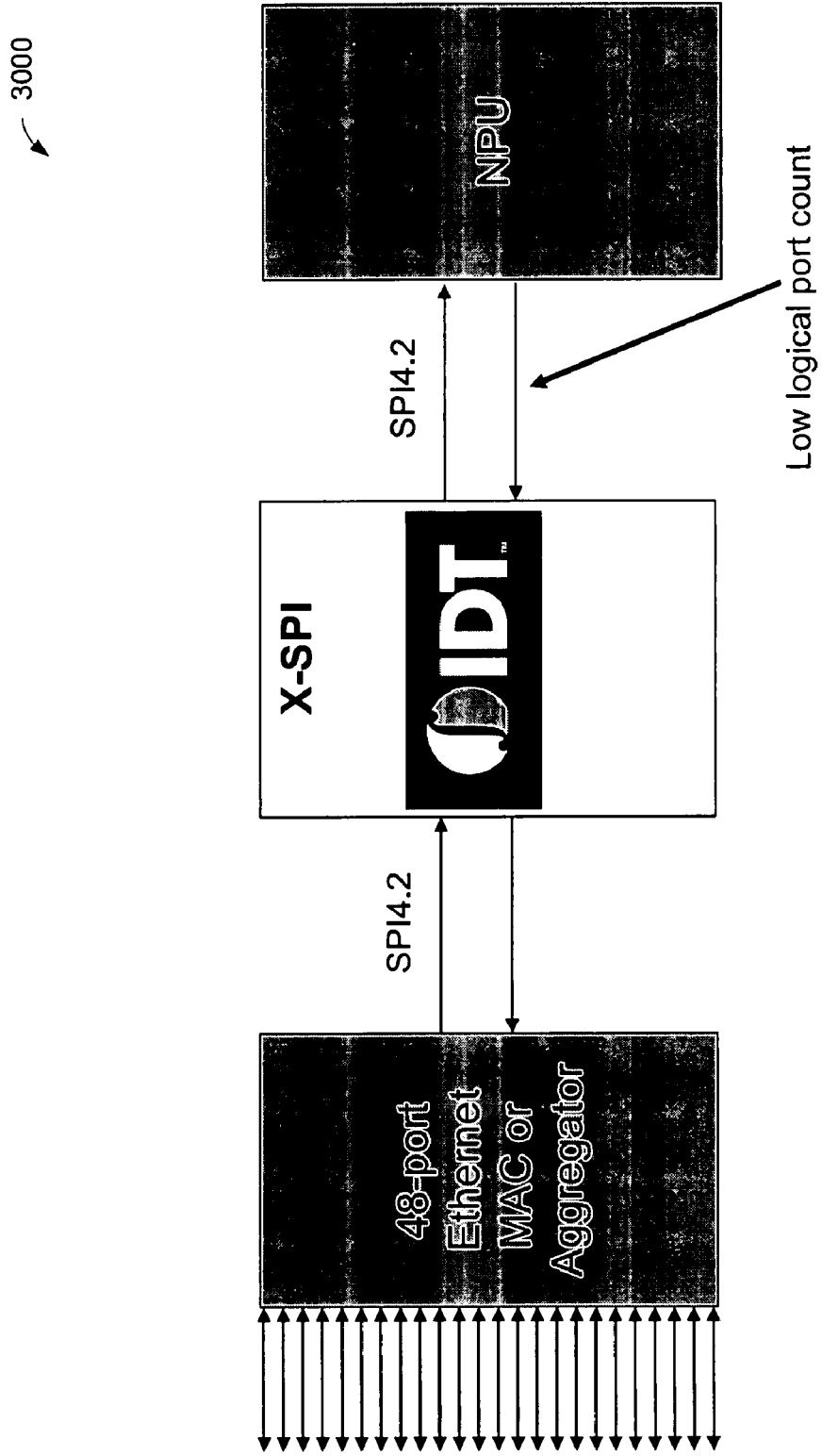
FIG. 30 illustrates one embodiment of the present invention showing a 10/100/1000 line card.

FIG. 30 illustrates one embodiment of the present invention showing a 10/100/1000 line card 3000.

In one embodiment the present invention allows bandwidth to be aggregated to higher system rates. For example, aggregation to 10G Ethernet within a system. Additionally, the present invention supports n×10G and other requirements. The present invention supports flexible system architectures, provides connectivity and reachability for real-time and multimedia traffic, flexible control of processing resources by supporting multiple protocols and data rates, supports implementation of standards-based interfaces for easy component integration, and provides minimized delay, jitter and data loss.

In one embodiment of the present invention aggregation and backpressure bottleneck problems between the switch fabric and the line are reduced. In another embodiment the present invention performs wire-speed memory intensive tasks thus off-loading NPU (network processor unit)/CPU (central processor unit) processing.

One detailed description of an embodiment of the present invention is detailed below. For discussion sake, the embodiment of the present invention in the form of a physical part is described and a part number 8480 denotes the part.

Features
Functionality
Exchange device connects low logical port count SPI-4 to high logical port count SPI-4 devices
Connects low logical port count SPI-4 to low channel count SPI-4 devices with optional port detection and packet tagging for up to 256 virtual ports
Aggregates logical ports (LPs) from 2 SPI-4 to one SPI-4
Creates virtual port groups within clear channel logical ports
Builds port maps based on standard or proprietary packet headers
Per LP configurable memory allocation
Internal clock generators allow fully flexible, fully integrated clock derivations and generation
Standard Interfaces
Three OIF SPI-4 phase 2: 87-500 MHz, 256 address range, 256 concurrently active LPs per interface
SPI-4 FIFO status channel options:
LVDS full-rate, LVDS quarter-rate, LVTTL quarter-rate
SPI-4 compatible with Network Processor Streaming Interface (NPSI NPE-Framer mode of operation)
External memory interfaces for up to 4 optional memory banks
Serial or parallel microprocessor interface for control and monitoring
IEEE 1491.1 JTAG
Performance Monitoring Counters
Number of packets, bursts and errors per logical port
Number of bytes per physical port Some applications for this part are: Ethernet transport, Security firewalls, SONET/SDH or PDH (plesiochronous digital hierarchy) packet transport line cards, Broadband aggregation, Multi-service switches, IP services equipment, etc.

Description

The 8480 is a clear channel SPI-4 Exchange device. The 8480 uses a SPI-4 implementation and packet fragment processor (PFP) design. The 8480 suits applications where SPI-4 is used as a common aggregation interface for system applications having either Sonet/SDH or PDH network interfaces or Ethernet used as a switching or packet transport medium. The Packet Fragment Processor based design is suited to designs that have relatively slow backpressure response times due to bursty traffic aggregation.

The data on each interface logical port (LP) are first mapped to one or more virtual ports that are further mapped to a logical identifier (LID). A data flow between virtual or logical port addresses on the various interfaces is accomplished using LID maps that can be dynamically reconfigured. The device enables data transfer and flow control management between network processors, physical or link later devices, switch fabric interfaces, traffic managers and co-processors. The device supports a maximum of 256 logical or virtual ports.

Introduction

The 8480 device is a SPI exchange device intended for use in Ethernet switches and routers, security firewalls, and session management equipment. The Optical Interworking Forum defines the SPI-4 interfaces. The device can be used to provide flow control management functions such as rate adaptation, switching and aggregation between network processor units, framers and PHYs, and switch fabric interface devices.

Data Path Overview

In normal operation, there are three bidirectional data paths through the 8480. They are the SPI-4 tributary A to main SPI-4 data path, the SPI-4 tributary B to main SPI-4 data path and the SPI-4 tributary A to SPI-4 tributary B data path.

SPI-4A to SPI-M Data Path

Data enter in bursts on a SPI-4 A interface and are received by the SPI-4 interface block. A reverse lookup of the first 128 bits after the SPI-4 SOP control word is performed and the bursts are mapped to a virtual port identifier (VID). If no match is found the bursts are optionally copied to a wildcard virtual port or dropped. A second mapping maps the virtual port identifier (VID) to a SPI-4M egress logical Identifier (LID). A third mapping maps the LID to a SPI-4M egress address. The burst is copied into memory of the PFP until the SPI-4 M egress scheduler determines that the data are to be transferred to the SPI-4M egress interface. An optional 16 or 32 bit tag may be pre-pended to the burst stored in the PFP. The tag may have any programmable value per VID.

In the SPI-M to SPI-4A path, data enter in bursts on a SPI-4 M interface and are received by the SPI-4 interface block. A reverse lookup of the first 128 bits after the SPI-4 SOP control word is performed and the bursts are mapped to a virtual port identifier (VID). If no match is found the bursts are optionally copied to a wildcard virtual port or dropped. A second mapping maps the virtual port identifier (VID) to an egress logical Identifier (LID). A third mapping maps the LID to a SPI-4A egress address. The burst is copied into memory of the PFP until the SPI-4A egress scheduler determines that the data are to be transferred to the SPI-4A egress interface. An optional 16 or 32 bit tag may be pre-pended to the burst in the PFP. The tag may have any programmable value per VID.

Correct mapping of a SPI-4 logical port to a SPI-M logical port is achieved using fixed mapping tables that may be dynamically reconfigured. Any configured data path consisting of SPI-4 ingress LP, Virtual Port ID, Logical ID and SPI-4 egress LP may be reconfigured, activated or deactivated in each direction without any affect on other remaining data paths.

SPI-4B to SPI-4M Data Path

This data path is similar to the SPI-4A to SPI-4M data path described above.

SPI-4A to SPI-4B Data Path

This data path is similar to the SPI-4A to SPI-4M data path described above except that the egress of the SPI-4A PFP is redirected per LID to an ingress VID of the SPI-4B PFP. Similarly the egress of the SPI-4B PFP is redirected per LID to an ingress VID of the SPI-4A PFP.

In addition to the datapaths described above, there are additional datapaths between the SPI-4 ports, and the microprocessor. the SPI-4 A, SPI-4 B and SPI-4M interfaces have the ability to perform a per-IP loopback. In addition, the SPI-4 interface can be configured to transfer packet bursts or optionally complete packets on a per-IP basis.

External Interfaces

The external interfaces provided on the 8480 device are three SPI-4 interfaces, four high speed memory interfaces, a pin-selectable serial or parallel microprocessor interface, a JTAG interface, and five general purpose input or output (GPIO) pins. The following information contains a set of the highlights of the features supported from the relevant standards, and a description of additional features implemented to enhance the usability of these interfaces for the system architect.

Figure 31:
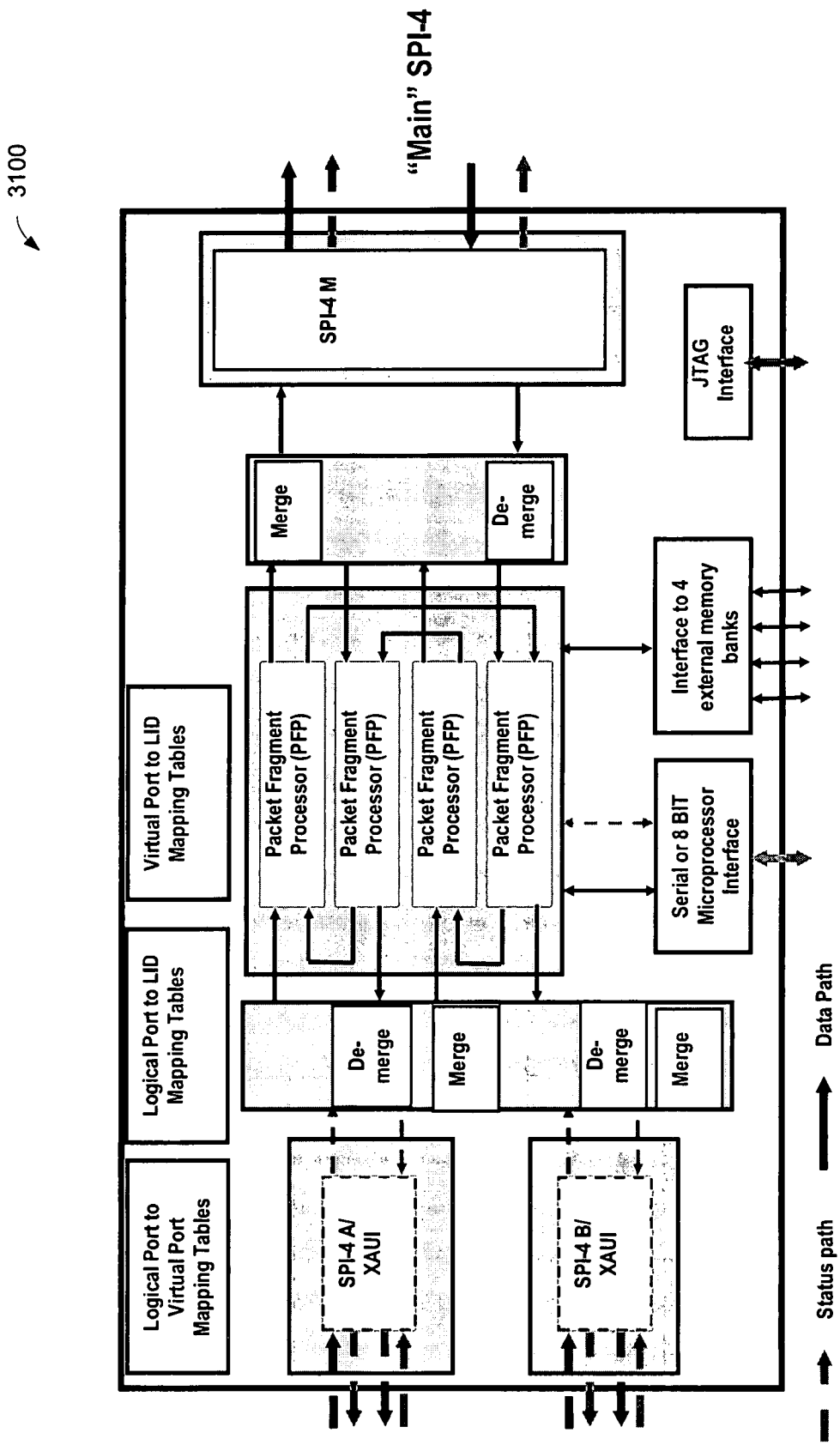
FIG. 31 illustrates one embodiment of the present invention showing a functional block diagram.

SPI-4 Interface
  clock rate is 87-400 MHz DDR
  link and PHY interface modes are supported
  logical port address support for 256 simultaneously active logical ports
  MAXBURST parameters configurable from 16 to 256 bytes in 16 byte multiples
  256-entry FIFO status calendar
  Quarter-clock-rate LVTTL, quarter rate or full-rate LVDS FIFO status signals are selectable
Microprocessor Interface
Parallel Microprocessor Interface
  Eight bit data bus
  Six bit address bus
  Pin-selectable Intel or Motorola control signals
  Direct accessed space used for quick interrupt processing
  Expanded indirect access space used for provisioning
  Read operations to a reserved address or reserved bit fields return 0
  Write operations to reserved addresses or bit fields are ignored
Serial Microprocessor Interface
  Compliance to Motorola Serial Processor Interface (SPI) specification
  Byte access
  Direct accessed space used for quick interrupt processing
  Expanded indirect access space used for provisioning
  Read operations to a reserved address or reserved bit fields return 0
  Write operations to reserved addresses or bit fields are ignored GPIO
  Five GPIO signals are provided. Each signal may be independently defined as an input or an output pin.
  The GPIO interface allows flexible use of the GPIO pins. The following can be defined per GPIO pin:
    Direction: input or output
    Level: value to write if programmed to be an output, or value that is being read if programmed to be an input FIG. 31 illustrates one embodiment of the present invention showing a functional block diagram 3100.

Figure 32:
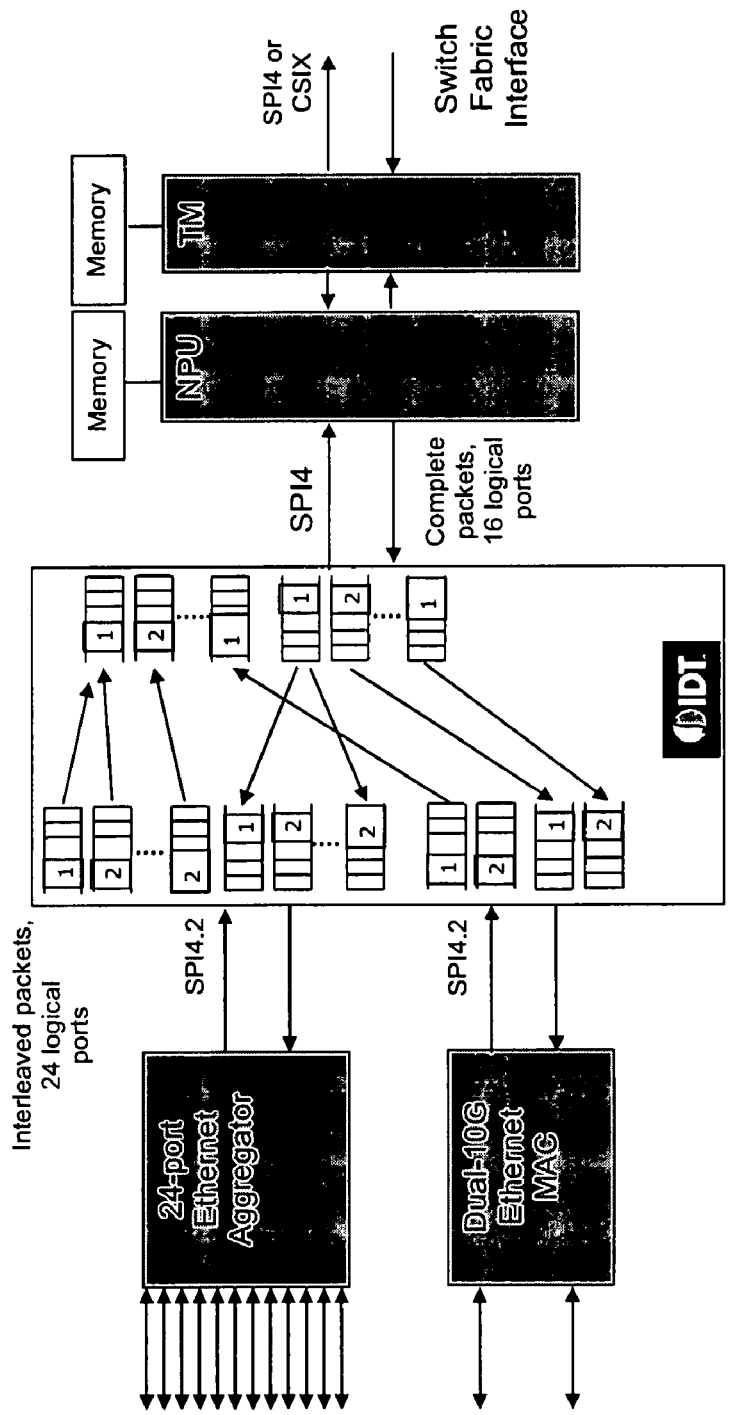
FIG. 32 illustrates one embodiment of the present invention showing a connection between a 24×Gb Ethernet Aggregator, a Dual 10 Gb Ethernet Uplinks and a NPU.

FIG. 32 illustrates one embodiment of the present invention showing a connection between a 24×Gb Ethernet Aggregator, a Dual 10 Gb Ethernet Uplinks and a NPU 3200.

Thus a method and apparatus for switching, merging, and demerging data between data communication locations have been described.

Figure 1:
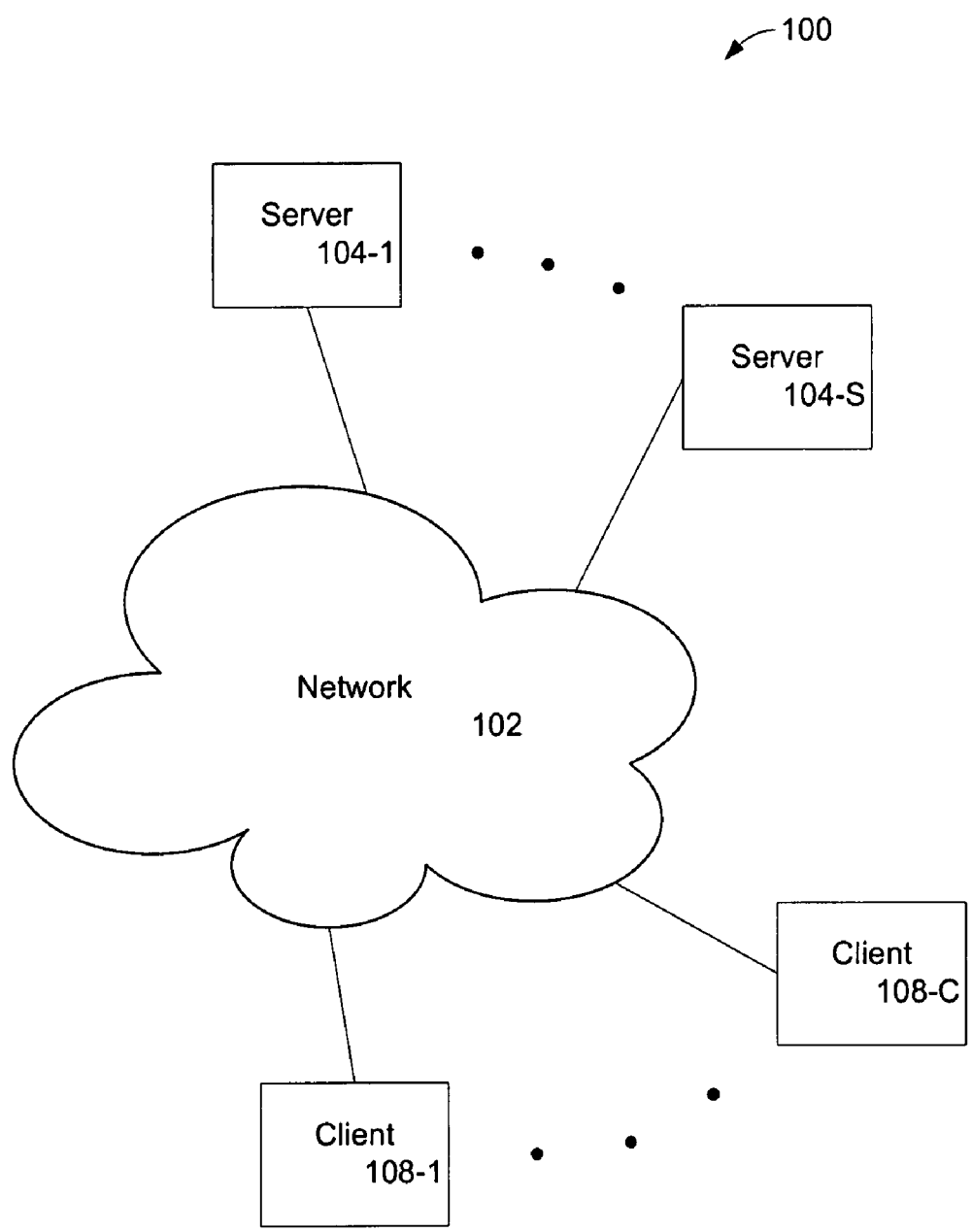
FIG. 1 illustrates a network environment in which the method and apparatus of the invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
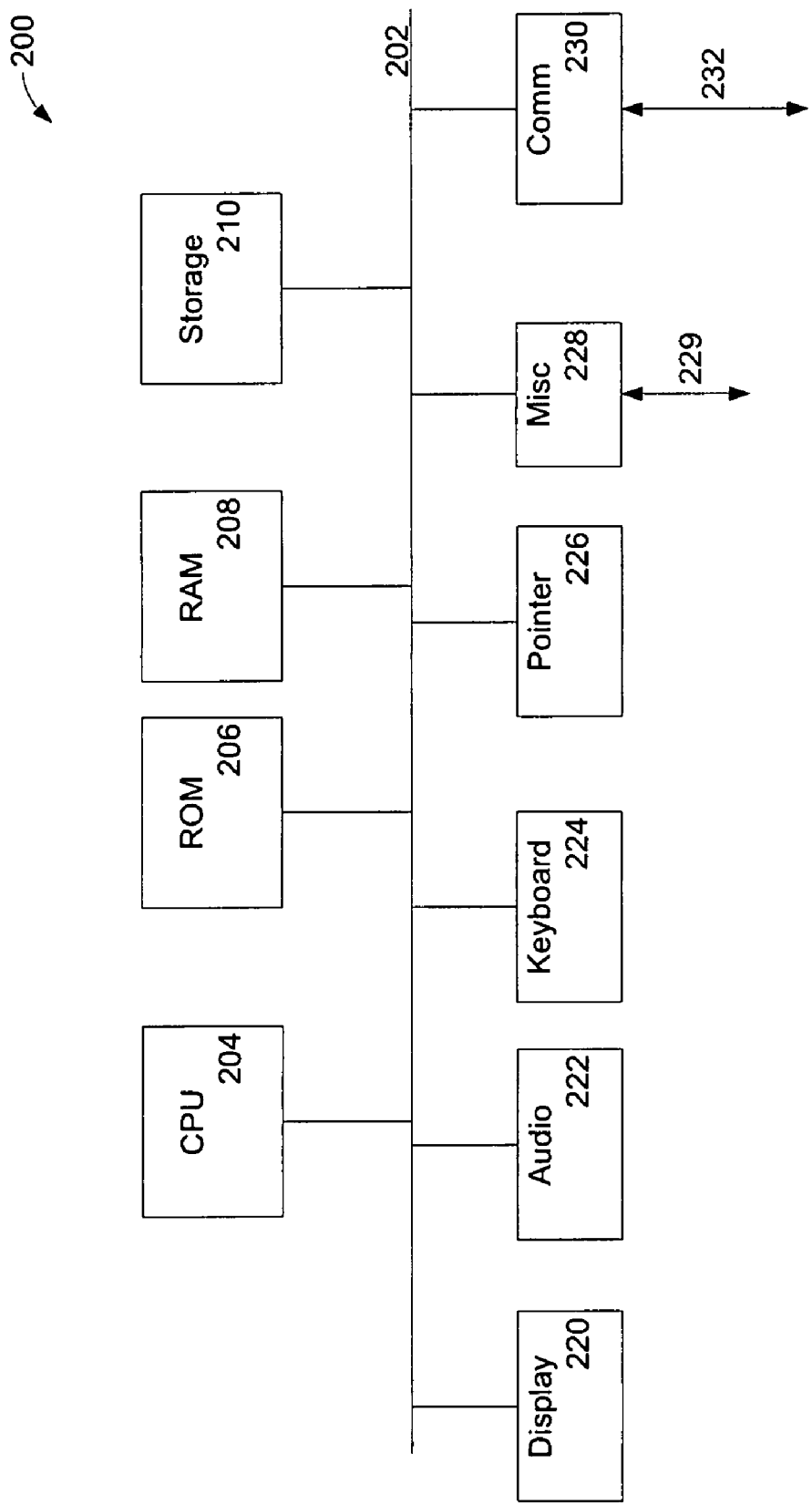
FIG. 2 is a block diagram of a computer system in which some embodiments of the invention may be used.
Figure 3:
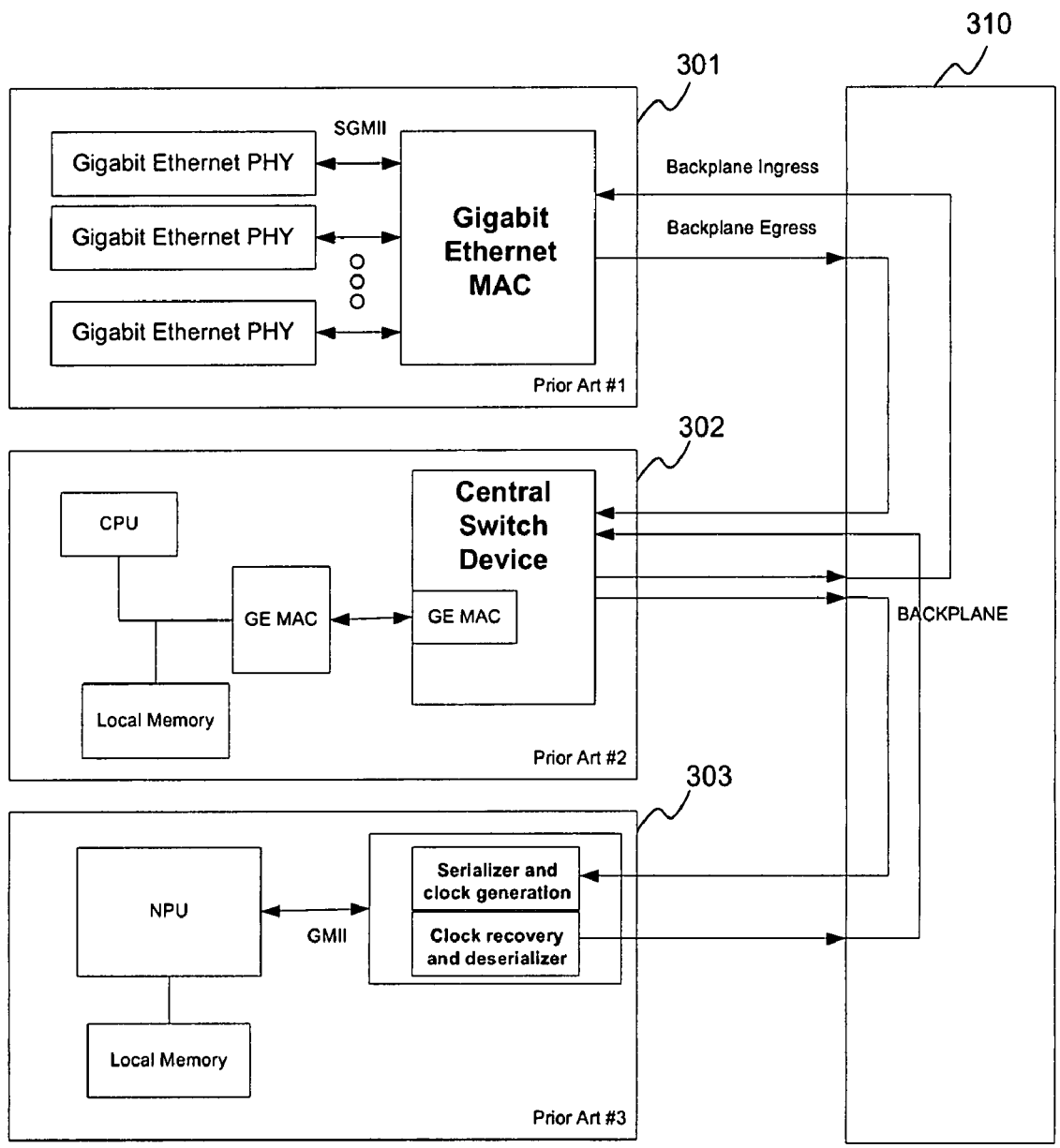
FIG. 3 illustrates several current approaches.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of visual communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for switching, merging, and demerging data between data communication locations have been described.

What is claimed is:

1. An apparatus comprising;
   a media interface card having a first Input/Output (I/O) port for communication via a protocol selected from the group consisting of T1, E1, T2, E2, T3, E3, DS4, E4, DS1, DS2, DS3, 1 MB Ethernet, 10 MB Ethernet, 100 MB Ethernet, 1 GB Ethernet, 10 GB Ethernet, Backplane Ethernet, resilient packet ring, Frame Relay, VDSL, ADSL, DSL, FCS, FDDI, Firewire, SCSI, Fiberchannel, FICON, ESCON, STS-1, OC-1, OC-3, OC-12, OC-48, OC-192, OC-768, ATM UNI, ATM NNI, WiFi, WiMAX, and ATM, and a second I/O port for communicating via a SPI-4 (System Packet Interface Level 4) interface;
   a protocol conversion block having a first I/O port and a second I/O port, said first I/O port for communicating via a SPI-4 interface and connected to said line interface card second I/O port, and said second I/O port for communicating via Gigabit Ethernet; and
   a processor having an I/O port for communicating via a Gigabit Ethernet protocol and connected to said protocol conversion block second I/O port.

2. The apparatus of claim 1 wherein said processor connected to said protocol conversion block second I/O port is via a backplane for handling Gigabit Ethernet communications.

3. The apparatus of claim 1 wherein said processor is selected from the group consisting of a network processor, a search engine, and a general purpose processor.

4. A method comprising:
   receiving a communication via a protocol selected from the group consisting of T1, E1, T2, E2, T3, E3, DS4, E4, DS1, DS2, DS3, 1 MB Ethernet, 10 MB Ethernet, 100 MB Ethernet, 1 GB Ethernet, 10 GB Ethernet, Backplane Ethernet, resilient packet ring, Frame Relay, VDSL, ADSL, DSL, FCS, FDDI, Firewire, SCSI, Fiberchannel, FICON, ESCON, STS-1, OC-1, OC-3, OC-12, OC-48, OC-192, OC-768, ATM UNI, ATM NNI, WiFi, WiMAX, and ATM, and a second I/O port for communicating via a SPI-4 interface;
   converting said received communication into a SPI-4 protocol;
   packaging said SPI-4 protocol into a Gigabit Ethernet protocol; and
   sending said Gigabit Ethernet communications to a processor.

5. The method of claim 4 wherein said packaging does not terminate said received communication.

6. The apparatus of claim 4 wherein said processor is selected from the group consisting of a network processor, a search engine, and a general purpose processor.

7. A method comprising:
   receiving one or more communications having one or more first protocols;
   aggregating said one or more communications into one or more 10 GbE interfaces; and
   interfacing said one or more 10 GbE interfaces to one or more second communication protocols.

8. The method of claim 7 wherein said one or more first protocols and said one or more second protocols are selected from the group consisting of T1, E1, T2, E2, T3, E3, DS4, E4, DS1, DS2, DS3, 1 MB Ethernet, 10 MB Ethernet, 100 MB Ethernet, 1 GB Ethernet, 10 GB Ethernet, 100 GB Ethernet, Backplane Ethernet, resilient packet ring, Frame Relay, VDSL, ADSL, DSL, FCS, FDDI, Firewire, SCSI, Fiberchannel, FICON, ESCON, STS-1, OC-1, OC-3, OC-12, OC-48, OC-192, OC-768, ATM UNI, ATM NNI, WiFi, WiMAX, Advanced switching, and PCIe.

9. The method of claim 7 wherein said protocols are at one or more data rates.

* * * * *